(12) United States Patent
Anderson

(10) Patent No.: US 8,751,822 B2
(45) Date of Patent: Jun. 10, 2014

(54) CRYPTOGRAPHY USING QUASIGROUPS

(75) Inventor: Lex Aaron Anderson, Auckland (NZ)

(73) Assignee: Motorola Mobility LLC, Chicago, IL (US)

( * ) Notice: Subject to any disclaimer, the term of this patent is extended or adjusted under 35 U.S.C. 154(b) by 354 days.

(21) Appl. No.: 12/974,952

(22) Filed: Dec. 21, 2010

(65) Prior Publication Data

US 2012/0159194 A1    Jun. 21, 2012

Related U.S. Application Data

(60) Provisional application No. 61/425,086, filed on Dec. 20, 2010.

(51) Int. Cl.
| | |
|---|---|
| *H04L 9/00* | (2006.01) |
| *G06F 11/30* | (2006.01) |
| *G06F 12/14* | (2006.01) |
| *H04K 1/00* | (2006.01) |
| *H04L 9/28* | (2006.01) |

(52) U.S. Cl.
USPC ............... 713/190; 713/193; 380/28; 380/44; 380/270; 380/277

(58) Field of Classification Search
None
See application file for complete search history.

(56) References Cited

U.S. PATENT DOCUMENTS

| | | | | |
|---|---|---|---|---|
| 8,254,571 | B1 * | 8/2012 | Boyen | 380/44 |
| 2008/0184041 | A1 | 7/2008 | Jakubowski et al. | |
| 2010/0153747 | A1 * | 6/2010 | Asnaashari et al. | 713/193 |

OTHER PUBLICATIONS

Herbst et al: "An AES Smart Card Implementation Resistant to Power Analysis Attacks," Applied Cryptography and Network Security Lecture Notes in Computer Science; pp. 239-252; Jan. 1, 2006.
Tillich et al: "Protecting AES Software Implementations on 32-Bit Processors Against Power Analysis." Applied Cryptography and Network Security Lecture Notes in Computer Science; pp. 141-157, Jun. 5, 2007.
Benadjila, et al: "Drm to counter side-channel attacks?" Proceedings of the 2007 ACM Workshop on Digital Rights Management) CT-VC Meeting, pp. 23-32; Oct. 29, 2007.
Bringer et al.: "White Box Cryptography: Another Attempt." Dec. 20, 2006, Mar. 14, 2012.
Patent Cooperation Treaty, "International Search Report and Written Opinion of the International Searching Authority," for Int'l Application No. PCT/US2011/064522; Apr. 4, 2012.
Strehovsky, "Advanced self-modifying code," pp. 1-5; Aug. 2, 2007.
Atkin et al., "Enumeration and Construction of Pandiagonal Latin Squares of Prime Ordert", Computers & Mathematics with Applications, vol. 9, Issue 2, pp. 267-292, 1983.
Barker, E., Barker, W., Burr, W., Polk, W., Smid, M., 2007. NIST Special Publication 800-57. NIST Special Publication 800-57.
Bell, J., "An introduction to SDR's and Latin squares" Morehead Electronic Journal of Applicable Mathematics, Issue 4—Math—Mar. 2005, 8 pages.
Billet et al., Cryptanalysis of a White Box AES Implementation In: Selected Areas in Cryptography 2004, vol. 3357. Springer, pp. 227-240, 2005.

(Continued)

*Primary Examiner* — Shin-Hon Chen

(57) ABSTRACT

A method and apparatus 20 for securing executable code embodying a cipher 12 using a metamorphic algorithm 24. The metamorphic algorithm 24 dynamically executes polymorphic primitives 43, each of which implements a functional component 41 of the cryptographic algorithm 12. When a halting condition is met, the output of the cryptographic algorithm 12 occurs.

25 Claims, 15 Drawing Sheets

(56) References Cited

OTHER PUBLICATIONS

Cappaert et al., 2006. "Self-encrypting Code to Protect Against Analysis and Tampering" In: 1st Benelux Workshop on Information and System Security (WISSec 2006), Citeseer, 14 pages.
Cardelli, L and Wegner, P., "On Understanding Types, Data Abstraction, and Polymorphism" ACM Computing Surveys (CSUR) vol. 17 No. 4, pp. 471-522, Dec. 1985.
Chow, S., Eisen, P., Johnson, H., Van Oorschot, P., 2003. White-box Cryptography and an AES Implementation. In: Lecture Notes in Computer Science, vol. 2595, pp. 250-270, 2003.
C. Collberg, E. Carter, S. Debray, A. Huntwork, J. Kececioglu, C. Linn, and M. Stepp. 2004. Dynamic path-based software watermarking. In Proceedings of the ACM SIGPLAN 2004 conference on Programming language design and implementation (PLDI '04). ACM, New York, NY, USA, 107-118.
Collberg, C., Thomborson, C., Low, D., 1997. A taxonomy of obfuscating transformations. Technical Report 148, Department of Computer Science, University of Auckland, Jul. 1997, 36 pages.
Daemen, J., Rijmen, V., 2002. "The design of Rijndael: AES—The Advanced Encryption Standard" [Book]. Springer Verlag.
Goldreich, Oded. "Foundations of Cryptography, 2001." (2001). Cambridge university press.
Herzberg, Amir, et al. "Towards a theory of white-box security." Emerging Challenges for Security, Privacy and Trust. Springer Berlin Heidelberg, 2009. 342-352.
Barak, Boaz, et al. "On the (im)possibility of obfuscating programs." Advances in Cryptology—CRYPTO 2001. Springer Berlin Heidelberg, 2001.
Jacobson, M., Matthews, P., 1996. Generating uniformly distributed random latin squares. Journal of Combinatorial Designs 4 (6), 405-437.
Kerckhoffs, A., 1883. La cryptographie militaire. Journal des sciences militaires 9 (1), 5-38.
Koscielny, C. Z. E. S. L A. W. "Generating quasigroups for cryptographic applications." International Journal of Applied Mathematics and Computer Science 12.4 (2002): 559-570.
Laywine, C., Mullen, G., 1998. Discrete mathematics using Latin squares. Wiley-Interscience.
Link, H., Neumann, W., 2004. Clarifying obfuscation: improving the security of white-box encoding. Sandia National Laboratories, Albuquerque, NM, downloaded from eprint. iacr. org/2004/025.pdf.
Madou, M., Van Put, L., De Bosschere, K., 2006. Understanding obfuscated code. In: 14th IEEE International Conference on Program Comprehension, 2006. ICPC 2006. pp. 268-274.
Menezes, Alfred J., Paul C. Van Oorschot, and Scott A. Vanstone. Handbook of applied cryptography. CRC press, 2010.
Nakamura, Y., Matsumoto, K., 1991. Exploiting self-modification mechanism for program protection. In: Proceedings: COMPSAC . . . the IEEE Computer Society?s . . . International Computer Software & Applications Conference. Citeseer, p. 170.
Pinson, L., Wiener, R., 1988. An introduction to object-oriented programming and Smalltalk. Addison-Wesley Longman Publishing Co., Inc. Boston, MA, USA.
Shannon, C., 1949. Communication theory of secrecy systems. bell systems technology. Journal 28, 656-715.
Shcherbacov, V., 2003. On some known possible applications of quasigroups in cryptology. Electronic version.
Udupa, S., Debray, S., Madou, M., 2005. Deobfuscation: Reverse engineering obfuscated code. In: 12th Working Conference on Reverse Engineering, 10 pages.
Webster, A. F., and Stafford E. Tavares. "On the design of S-boxes." In Advances in Cryptology—CRYPTO'85 Proceedings, pp. 523-534. Springer Berlin Heidelberg, 1986.

\* cited by examiner

CRYPTOGRAPHY USING QUASIGROUPS

FIELD OF THE INVENTION

The present invention relates to securing executable programs, such as those implementing cryptography.

BACKGROUND TO THE INVENTION

Cryptographic techniques are used to protect information from unauthorized viewing/use. That information could take many forms, such as data, text or multimedia content, for example.

FIG. 1 shows a general outline of a generic process/apparatus for encryption or decryption of information. The cryptographic apparatus 10 comprises a processor 11 or similar that implements a cryptographic/cipher algorithm 12 using an executable program/code. The cryptographic algorithm 12 could be an encryption algorithm (cipher) or a decryption algorithm (inverse cipher). If the apparatus is implementing an encryption function, it receives information 13 (e.g. cleartext), and an encryption key or keys 14. The cipher algorithm uses these inputs to produce output 15 which is an encrypted form of the information (e.g. ciphertext). Alternatively, if the cryptographic apparatus is implementing a decryption function, it receives encrypted information (e.g. ciphertext) and a decryption key or keys. The inverse cipher algorithm uses these inputs to produce output which is an unencrypted form of the ciphertext (e.g. cleartext).

There are two main types of cryptography: The first is black box cryptography, which involves the use of encryption algorithms executing on a trusted apparatus, such as a server, that cannot be accessed without authorization. This prevents unauthorized parties from gaining access to sensitive information (such as the encryption and decryption keys) by analyzing the encryption/decryption algorithms The second is white box cryptography, which is used to protect sensitive information from scrutiny even if the algorithm is executed on an untrusted apparatus, which can be accessed without authorization. White box cryptography might be used, for example, on personal computers and mobile devices for receiving and decrypting media content for viewing on that device. On such a device any party has full visibility of code, inputs, outputs and internal states. A third party can attempt to circumvent white box cryptographic systems by correlating cipher inputs with cipher keys and cipher outputs.

SUMMARY OF INVENTION

The present invention may be said to consist in a method of securing an executable program comprising a cipher with a plurality of functional components each of which can be implemented by one or more polymorphic code blocks, the method comprising the following in any order: receiving input comprising information for encryption or decryption by the cipher, recursively executing the polymorphic code blocks repeatedly in any sequence and/or in parallel, on execution each polymorphic code block reads input from memory and generates and writes output to memory, wherein for any instance of execution the input and output might or might not be valid, checking for a halting condition using at least one polymorphic code block, outputting resultant decryption or encryption of the information when the halting condition occurs, the halting condition occurring when polymorphic code blocks implementing the functional components of the cipher have all been executed to provide valid output, the resultant decryption or encryption of information being the output from one or more of the polymorphic code blocks.

Preferably the read input comprises data that originates from a file, another polymorphic code block, network or other data source and upon execution the polymorphic code block executes at least a first transformation based on the data to generate the output.

Preferably the read input further comprises an input hash value, the output further comprises an output hash value, and each polymorphic code block comprises an identifier, wherein upon execution each polymorphic code block executes a hash transformation based on the input hash value and identifier to generate the output hash value, and wherein checking for the halting condition in at least one polymorphic code block comprises: comparing the output hash value of that polymorphic code block to an expected value, and determining occurrence of the halting condition when the output hash value of that polymorphic code block is the expected value.

Preferably invalid output from a polymorphic code block occurs when one or more of the following occur: the polymorphic code block has the wrong cryptographic state, the polymorphic code block reads input originating from a wrong polymorphic code block or other data source, the read input is invalid.

Preferably a plurality of finite-state automata code blocks each generate a composite quasigroup isotope for a layer that defines the cryptographic state for one or more polymorphic code blocks in that layer.

Preferably the method further comprises decrypting inputs read into and encrypting outputs written from one or more polymorphic code blocks, wherein each such polymorphic code block is in a layer and decrypts and/or encrypts inputs and/or outputs using the composite quasigroup isotope for that layer.

Preferably a polymorphic code block in a layer correctly decrypts input when the composite quasigroup isotope for that layer is a parastrophe of the composite quasigroup isotope used to encrypt that input.

In another aspect the present invention may be said to consist in a method of creating a metamorphic algorithm to implement a cipher, comprising: receiving a cipher, decomposing the cipher into polymorphic code blocks, where each polymorphic code block implements a functional component of the cipher using output from another polymorphic code block or other data source, compiling a cipher kernel that upon execution recursively executes repeatedly polymorphic code blocks in a non-sequential and/or parallel manner to read input and write output that might or might not be valid until a halting condition is met.

In another aspect the present invention may be said to consist in an apparatus for securely implementing an executable program comprising a cipher with a plurality of functional components each of which can be implemented by one or more polymorphic code blocks, the apparatus comprising: an input for receiving information for encryption or decryption by the cipher, an output for providing encrypted or decrypted information, and a processor configured to, in any order: recursively execute the polymorphic code blocks repeatedly in any sequence and/or in parallel, on execution each polymorphic code block reading input from memory and generating and writing output to memory, wherein for any instance of execution the input and output might or might not be valid, check for a halting condition using at least one polymorphic code block, output resultant decryption or encryption of the information when the halting condition occurs, the halting condition occurring when polymorphic code blocks implementing the functional components of the cipher have all been executed to provide valid output, the resultant decryption or encryption of information being the output from one or more of the polymorphic code blocks.

Preferably the read input comprises data that originates from a file, another polymorphic code block, network or other data source and upon execution the polymorphic code block executes at least a first transformation based on the data to generate the output.

Preferably the read input further comprises an input hash value, the output further comprises an output hash value, and each polymorphic code block comprises an identifier, wherein upon execution each polymorphic code block executes a hash transformation based on the input hash value and identifier to generate the output hash value, and wherein checking for the halting condition in at least one polymorphic code block comprises: comparing the output hash value of that polymorphic code block to an expected value, and determining occurrence of the halting condition when the output hash value of that polymorphic code block is the expected value.

Preferably invalid output from a polymorphic code block occurs when one or more of the following occur: the polymorphic code block has the wrong cryptographic state, the polymorphic code block reads input originating from a wrong polymorphic code block or other data source, the read input is invalid.

Preferably a plurality of finite-state automata code blocks each generate a composite quasigroup isotope for a layer that defines the cryptographic state for one or more polymorphic code blocks in that layer.

Preferably one or more polymorphic code blocks decrypt inputs read and encrypt outputs written, wherein each such polymorphic code block is in a layer and decrypts and/or encrypts inputs and/or outputs using the composite quasigroup isotope for that layer.

Preferably a polymorphic code block in a layer correctly decrypts input when the composite quasigroup isotope for that layer is a parastrophe of the composite quasigroup isotope used to encrypt that input.

In another aspect the present invention may be said to consist in apparatus for creating a metamorphic algorithm to implement a cipher, comprising: an input for receiving a cryptographic algorithm, a processor configured to: receive a cipher, decompose the cipher into polymorphic code blocks, where each polymorphic code block implements a functional component of the cipher using output from another polymorphic code block or other data source, compile a cipher kernel that upon execution recursively executes repeatedly polymorphic code blocks in a non-sequential and/or parallel manner to read input and write output that might or might not be valid until a halting condition is met.

The method and apparatus above increase security of programs executing in a white box environment.

BRIEF DESCRIPTION OF THE DRAWINGS

Embodiments will be described with reference to the following FIGS.

DETAILED DESCRIPTION OF PREFERRED EMBODIMENTS

General Description of Securing an Executable Program

A cryptographic (cipher), obfuscation or other algorithm 12 is implemented in an executable program. The executable program can be made more secure before and during execution by implementing a combination of cryptographic techniques and overlapping obfuscation methods as polymorphic primitives (polymorphic code blocks) to create a structure that can implement the executable program in a dynamically executing metamorphic algorithm. The metamorphic algorithm implements the functionality of the underlying cryptographic algorithm 12. This results in confusion, diffusion, unpredictability and obfuscation and other characteristics, which makes the implementation of the cryptographic algorithm more secure.

A metamorphic algorithm as described could be generated and executed to secure executable code (program) embodying any type of algorithm. It is useful for cryptographic/cipher algorithms but could be used for securing executable code embodying other types of algorithms. The metamorphic algorithm architecture secures the executable code both prior to and during execution, making it difficult for an adversary to analyze the code either prior to or during execution. Embodiments will be described with reference to cryptographic/cipher algorithms, although this should not be considered limiting. References to implementing cryptographic/cipher algorithms can be considered to also refer to the executable program/code embodying the cryptographic/cipher algorithm.

Figure 1:
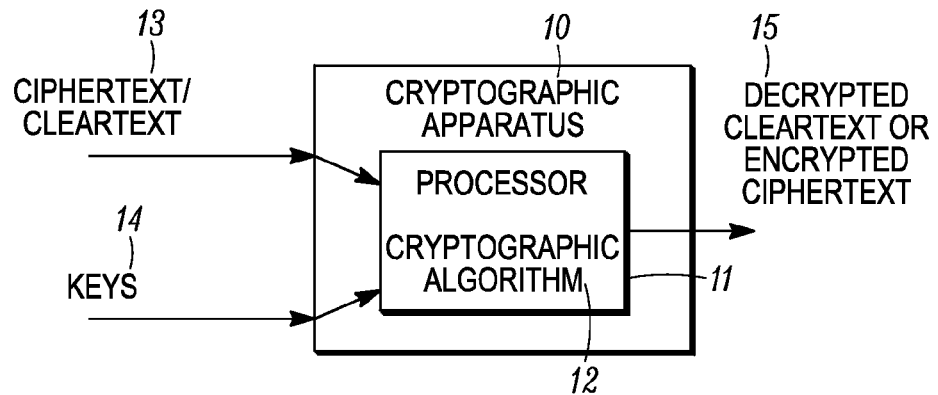
FIG. 1 is a block diagram of an apparatus implementing a cryptographic/cipher algorithm.
Figure 2:
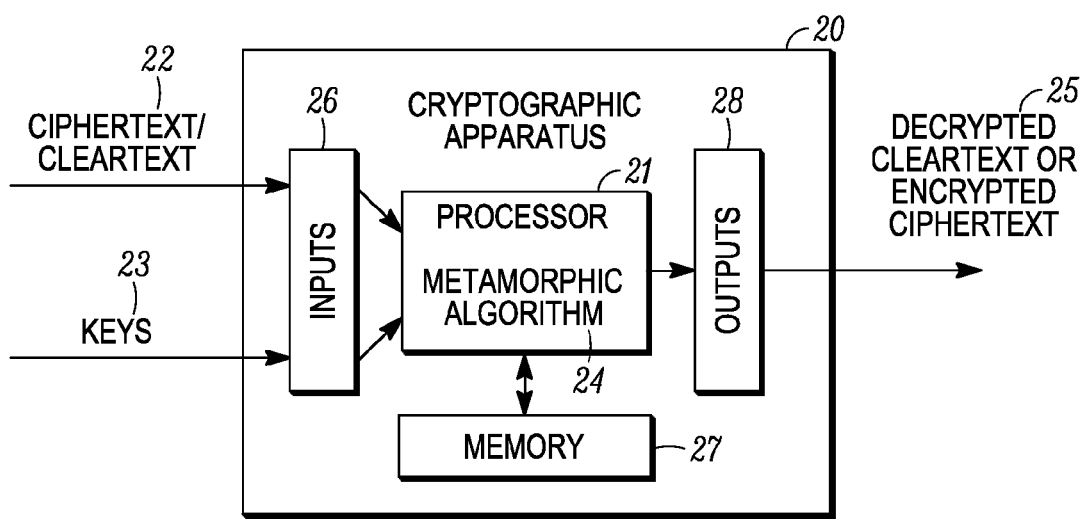
FIG. 2 is a block diagram of an apparatus implementing a metamorphic algorithm that implements a cryptographic/cipher algorithm.

A general overview of a metamorphic algorithm that implements a cryptographic algorithm, including its construction and use, will be briefly described with reference to FIGS. 2 to 6. FIG. 2 shows in diagrammatic form an overview of an apparatus that facilitates a process 20 for executing a secure executable program that embodies a cryptographic/cipher algorithm e.g. 12. The cryptographic apparatus 20 could be a computer, mobile device, set-top box for multimedia reception or any other apparatus which is used for encryption or decryption of data, or would benefit from operating executable code in a secure manner. The apparatus 20 (host/target machine) has one or more inputs 26 through which it receives the information (e.g. cleartext or ciphertext) 22 and keys 23 for either encryption or decryption, as required. This input is passed to a processor 21 or similar operating on the apparatus 20. However, rather than the processor 21 implementing executable code that embodies the cryptographic algorithm 12 directly, the processor 21 executes executable code embodying a metamorphic algorithm 24, which itself implements the functionality of the desired cryptographic algorithm 12.

During execution, the metamorphic algorithm calls on functions and data in a memory 27, which can be external or internal to the processor 21. The metamorphic algorithm transforms the input 22, 23 and creates the desired encrypted or unencrypted information 25 (e.g. ciphertext or cleartext) which is provided to one or more outputs 28 of the apparatus 20.

The metamorphic algorithm 24 is composed of overlapping encryption and obfuscation techniques designed to increase the white-box cryptanalyst's (adversary's) work factor (difficulty) in a combinatorial manner—producing a security amplification greater than the sum of the individual protection techniques. The metamorphic algorithm 24 carries out an encoded deterministic task (including but not limited to, the underlying cryptographic algorithm) with maximally decoupled and non-deterministic control flow and maximally de-correlated and entropic data-flow; such that analysis of the program in a white-box environment will fail to yield useful information about the encoded underlying cryptographic algorithm 12 and any embedded secrets in a computationally feasible timeframe.

The metamorphic algorithm 24 is in the form of a dynamically executable program that provides a continually self-modifying algorithm upon execution, yet which always produces the same transformations as the underlying cryptographic algorithm. The metamorphic algorithm can be considered as program cipher; implementing a cryptographically secure substitution-permutation network that transforms polymorphic primitives into opaque functions. Because the compiler is fully aware of the
control flow and state transitions of the encoded algorithms; and because polymorphic primitives have a clearly designed functional and mathematical relationship with other polymorphic primitives; the compiler is able to generate permutations and substitutions (such as non-linear control-flow mapping and linear and non-linear keyed mixing transformations among others).

The term "metamorphic" in this context refers to the self-modifying nature of the executing program; where except for a small invariant static component (a cipher kernel, which will be described in detail later), the rest of a metamorphic algorithm is dynamically executing and self-modifying. The self-modifying nature of the dynamically executing metamorphic algorithm makes it difficult to reverse-engineer the underlying cryptographic algorithm, even using multiple attacks such as in fingerprinting or footprinting, for example.

Figure 3:
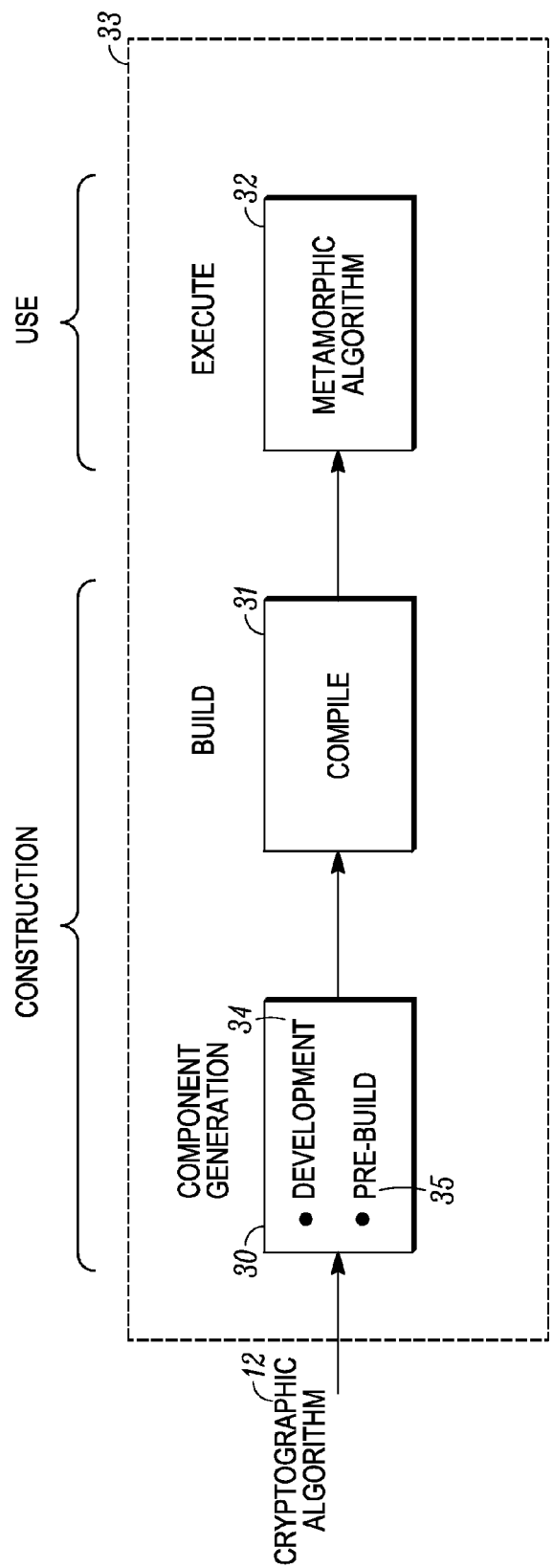
FIG. 3 is a process diagram showing the construction and execution stages of the metamorphic algorithm.
Figure 4:
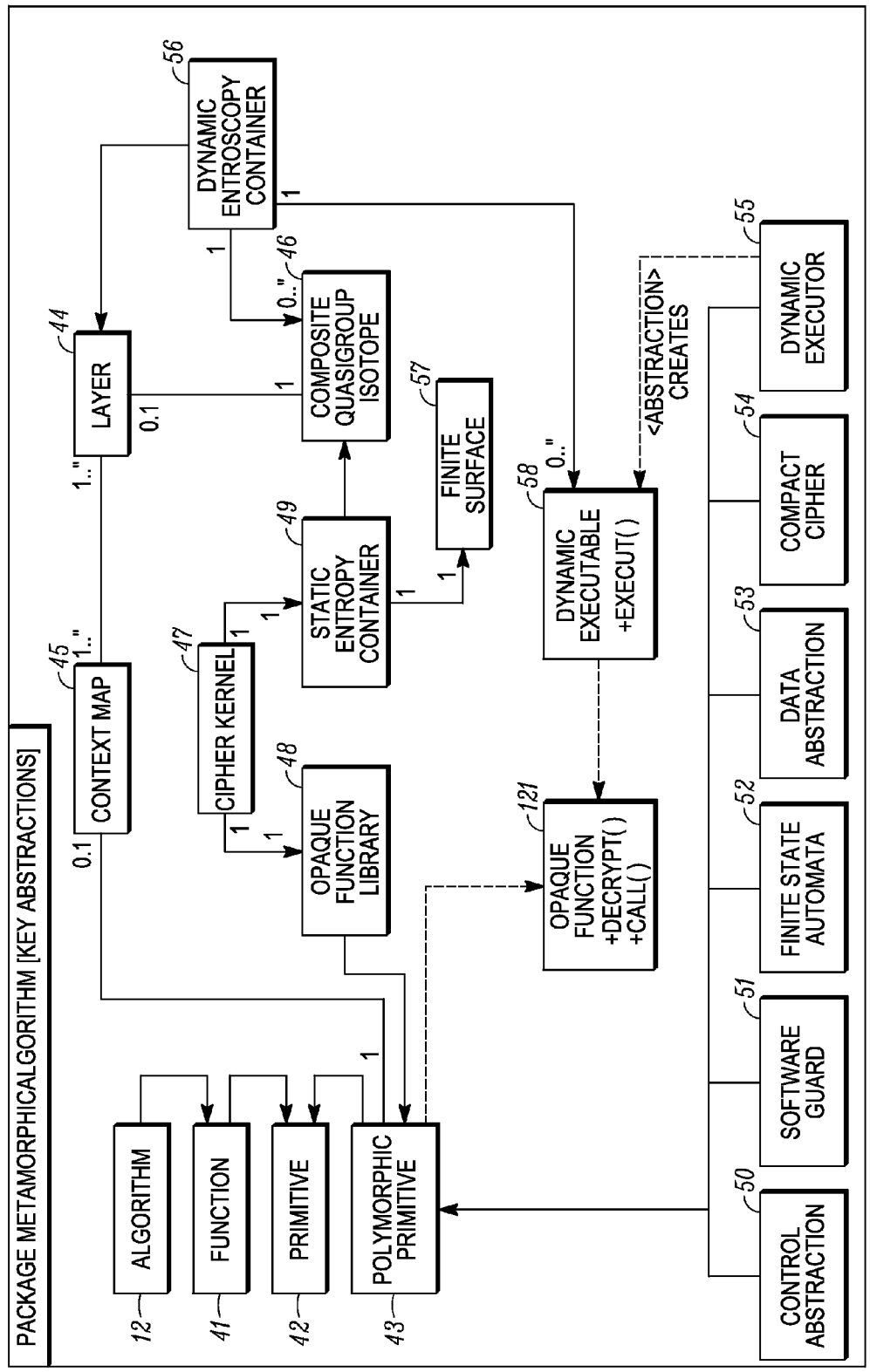
FIG. 4 is a block diagram of the metamorphic algorithm architecture.

FIGS. 3 and 4 show an overview of the construction, architecture and use (dynamic execution) of a metamorphic algorithm 24 that implements an underlying cryptographic algorithm 12. FIG. 3 shows a three stage method of constructing and using a metamorphic algorithm. First, there is the component generation stage, step 30, in which static components (such as polymorphic algorithms/primitives) are generated that are used to construct a cipher kernel 47. This stage comprises development and pre-build sub stages, steps 34/35, which will be described later with reference to FIGS. 8A, 8B.

Second, there is the build stage, step 31, in which the static components are compiled to form a cipher kernel 47. Stages one and two, steps 30, 31, form the construction phase. The component generation and build (that is, the construction) stages result in the metamorphic algorithm architecture shown in FIG. 4. Third, there is the execution (use) stage, step 32, in which the cipher kernel 47 is executed to implement the dynamically executing metamorphic algorithm 24, which itself implements the underlying cryptographic algorithm 12. The three stages, steps 30-32, are implemented on a processor based apparatus 33, such as a computer system, PC or the like, in combination with manual input.

Referring to FIGS. 3 and 4, the first, component generation stage, step 30, is a manual process which comprises, as described previously, the following.

A development sub stage, step 34, comprising decomposing the underlying cryptographic algorithm into polymorphic primitives according to the methodology explained below with reference to FIGS. 4 and 8.

A pre-build sub stage, step 35, comprising selecting or generating base composite quasigroups and their isotopes.

In the development substage, step 34, the underlying cryptographic algorithm 12 is deconstructed into functional components (functions) 41 each of which is abstracted into one or more primitives 42 (in the form of code fragments/blocks) that implement their respective functional components 41 of the cryptographic algorithm 12. This is a hierarchical process, whereby a functional component 41 itself can be broken into further functional (sub)components, each of which can be abstracted into one or more primitives 42.

A plurality of polymorphic variations 43 are created for each primitive, resulting in polymorphic primitives (also termed polymorphic primitive variations). Each polymorphic primitive is a polymorphic code block, which takes input, implements instructions/transformations and writes output. As a result, for each functional component there are multiple polymorphic primitives, each of which can implement that functional component. All polymorphic primitives implement the same two interfaces: dynamic executable and secure storable; which unlike the computational (object-oriented) forms of a polymorphic functions (or methods), do not restrict the number or nature of the arguments passed to that polymorphic primitive; effectively meaning that
every primitive can interact with every other primitive.

The dynamic executable interface enables a compiled polymorphic primitive to be executed in any sequence, recursively and/or in parallel. This means that primitives have all notion of control flow removed from them. This causes primitives to repeat their transformations for a random interval; until they are terminated or until a halting condition (which is only encoded into a very few top-level primitives) is met.

Each polymorphic primitive is mapped to a particular layer 44 via a context or opaque function map 55 at the development stage. A layer in a metamorphic algorithm embodies a cryptographic state caused by that layer having a particular quasigroup isotope that enables elements within that layer to be encrypted or decrypted. It is important to note that the same layer does not both encrypt and decrypt the same elements of state; nor do two polymorphic variations of the same primitive occupy the same layer. This forms the basis of a metamorphic algorithm's substitution-permutation network such that the context map in conjunction with the metamorphic compiler generates a non-linear mapping of algorithm function and executable code.

Note, use of the term "primitive" in this specification refers to the primitive in general and can encompass any instances/variations of that primitive. Use of the term "polymorphic primitive" refers to a specific instance/variation of a primitive. The term "polymorphic primitive" is used throughout the specification, but it will be appreciated that this can also be described as a polymorphic block of code (polymorphic code block).

Each polymorphic primitive that implements a functional component has a differing control and data pathway, yet when executed, each of the polymorphic primitives (for a particular functional component) producing identical transformations. Theoretically, executing in succession a polymorphic primitives 43 for each functional component would result in execution of the underlying cryptographic algorithm 12, where the output of a parent polymorphic primitives for a preceding functional component is passed to the input of a child polymorphic primitives for a succeeding functional component. However, the polymorphic primitives are not executed in linear succession in this manner, as will be described later. As each functional component 41 has multiple polymorphic primitives 43 (each of which carries out the function of that functional component), a vast number of different combinations of the polymorphic primitives for each respective functional component could be executed, any combination of which could carry out the functionality of the underlying algorithm.

Next, in the pre-build sub stage, step 35, composite quasigroups are created, which are used to generate quasigroup isotopes 46 during execution. The composite quasigroup isotopes are mapped to a layer 44 and are placed in a dynamic entropy container 56 during execution. During execution, these take input from a static entropy container 49 and provide a cryptographic context for the execution of the polymorphic primitives in a corresponding layer. The cryptographic context determines how a polymorphic primitives decrypts its inputs and encrypts its outputs.

The second, build, stage 31 is a two (sub)stage automated compilation process carried out. The compilation process is an automated process that builds of a unique Cipher kernel and optionally encodes it specifically for a particular host. A metamorphic compiler is the white-box equivalent of a cipher that—instead of bits and bytes of cleartext—it encrypts polymorphic primitives using the same principles as a traditional cipher.

Figure 5:
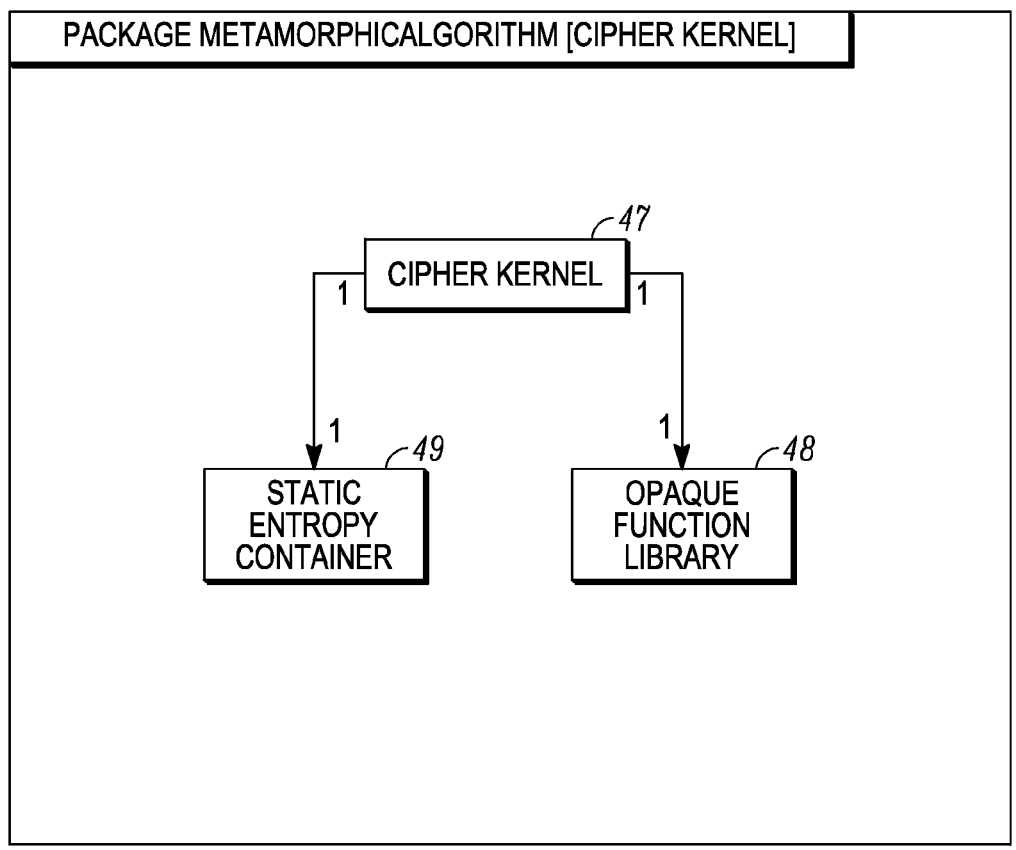
FIG. 5 is a block diagram of a cipher kernel architecture.

Compilation of a metamorphic algorithm is a multi-stage process. In the first sub stage, the polymorphic primitives 43 are compiled to produce the cipher kernel 47 that is executable code that encodes/initializes/executes the dynamically executing metamorphic algorithm 24. The cipher kernel encodes the metamorphic algorithm 24 using static elements in an opaque function library 48 and the static entropy container 49, as shown in FIGS. 4 and 5. The opaque function library contains the polymorphic primitives 43, and the static entropy container contains the composite quasigroup isotopes. In the second sub stage, when the cipher kernel 47 is to be shipped to the target apparatus/host (e.g. 20 in FIG. 2), it is node-locked and uploaded to the target apparatus/host that will carry out the encryption/decryption process.

In the build stage 31, further polymorphic primitives are also created using a compiler in the processor apparatus 33. These can also be compiled into the cipher kernel 47 within a metamorphic algorithm, such that every aspect of a metamorphic algorithm 24 is itself encoded as polymorphic primitives, executing inside one or more cipher kernels. The types of primitives that are created (and abstracted into polymorphic variations) comprise, for example: control abstraction 50, software guard 51, finite-state automata 52, data/state abstraction 53, compact cipher 54 and dynamic executor 55 primitives.

Figure 15:
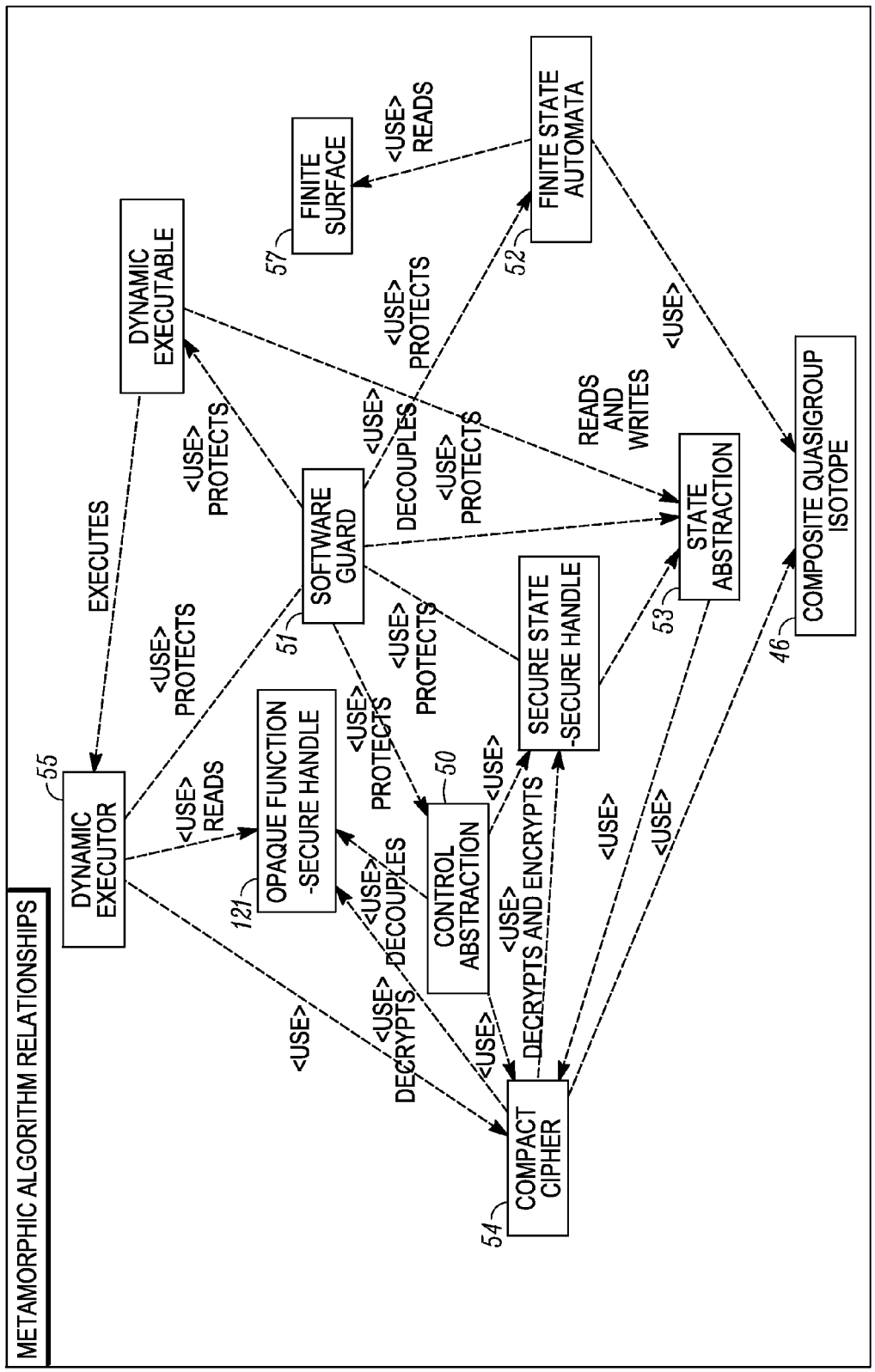
FIG. 15 is a block diagram showing the relationship between primitives in the metamorphic algorithm.

An example of the resulting polymorphic primitives and relationships between them is shown in FIG. 15—keeping in mind that the component parts that add white box security protection and encoded into polymorphic primitives that run alongside the polymorphic primitives that embody an encoded algorithm.

Referring to FIG. 15, primitives at the top of an abstraction tree that represent some high level function inside an algorithm are generally referred to as control abstraction primitives. The control abstraction primitives 50 are used to de-couple every executing block of code from every other executing block of code inside the metamorphic algorithm 24. This means that unlike regular program code—which requires step-wise progression through an instruction set—the metamorphic algorithm is executed in any order, parallelized and separated by indeterminate amount of time and processor operations. This means that control abstraction primitives are agnostic to sequence, time and the validity of their inputs. This generates a t-ary tree of multi-permutations of possible control pathways that is further compounded by the lack of knowledge whether a primitive is performing an invalid or invalid transformation or a partial transformation useful only by one or more other primitives in an indirection chain. On top of this, the polymorphic variations, which perform the same task but with different instructions, control flow and state transformation pathways. These vast multi-permutations make the correlation of an executing metamorphic algorithm with any algorithm an infeasible task for an adversary.

The data/state abstraction primitives 53 de-couple control flow and data flow by abstracting the relationship between the program instructions being executed by the processor and the data (memory addresses) they reference. They manipulate by the use of indirection, encryption and mixing bijections. Because these primitives operate in a diffused manner alongside all other primitives, this makes the footprinting of a metamorphic algorithm based on an examination of the state being manipulated a computationally challenging exercise, even if considered in the absence other overlapping protection mechanisms. This creates a computationally challenging (if not impossible) task of identification of hidden secrets, interim states or any form of footprinting of the algorithm based on the data being manipulated.

The software guard primitives 51 implement anti-reverse engineering, tamper protection algorithms, junk instructions and a range of other generic obfuscation mechanisms. The metamorphic compiler ensures that all primitives including these have some roll in diffusing the state or the control-flow of the encoded algorithms. Because of this primitives become inter-dependent; and as such tampering with any part of an executing metamorphic algorithm even by the alteration of a single bit will cause the entire algorithm to produce invalid results in a manner according to the strict avalanche criteria. The industry-standard tamper resistance software guard primitives are decomposed into polymorphic primitives and operate in addition to the inherent tamper resistance of such a highly overlapping, diffused and inter-dependent execution environment. Also, anti-reverse engineering (Anti-RCE) software guard primitives 51. These are also decomposed and included in the metamorphic algorithm. These represent techniques designed to prevent all known reverse engineering vectors—bearing in mind the inherently obfuscated nature of the execution environment provides the bulk of the protection against reverse engineering. Junk instruction software guard primitives are automatically generated both at compilation time and at execution time. These are used by all of the above to increase the work-factor involved by any form of manual or automated study of the executable in a combinatorial manner. Software guards are encoded and compiled to specifically protect other primitives as they receive input, execute, transform data and produce output.

The compact cipher primitives 54 implement quasigroup cryptographic primitives used for encrypting and decrypting interim state values as well as decrypting encrypted polymorphic primitives prior to their execution.

The dynamic execution primitives 55 allow polymorphic primitives to execute 58 other primitives in a decoupled and temporally random order, such that polymorphic variations of any part of an algorithm could be executed before or after any other part of an algorithm. These primitives drive the dynamic execution of the metamorphic algorithm. These primitives have no knowledge of the desired execution sequence of the encoded algorithm. These primitives use the compact cipher primitives 54 to decrypt and execute other primitives. The dynamic execution primitives 55 cause program code to be generated and executed at random times and at random locations inside the dynamic entropy container. Dynamic execution primitives cause other primitives to be randomly executed in a recursive or parallel manner. These primitives have no knowledge of the desired execution sequence of the encoded algorithm. These primitives use compact cipher primitives to decrypt and execute other primitives. Control flow is only preserved through the complex relationship between the cryptographic states of layer-based primitives generated by finite-state automata primitives and the dynamic messages created by data abstraction primitives in a large and randomized dynamic entropy container. This implements dynamic execution of primitives meaning that no part of the metamorphic algorithm remains invariant or static; including the algorithms that comprise the metamorphic algorithm itself. Polymorphic execution means that a multi-permutation set of possible execution patterns is generated at runtime.

The finite-state automata primitives 52 generate layer-based cryptographic states used to encrypt, decrypt and obfuscate polymorphic primitives and associated state. The finite-state automata primitives 52 do this by generating the layer-based composite quasigroup isotopes that are sent to a dynamic entropy container 56 and assigned to a layer. Each isotope sets the cryptographic context for a polymorphic primitive. Each isotope is assigned to a layer and is used by polymorphic primitives in that layer to decrypt/encrypt inputs/outputs. In a manner to be described in more detail later, the finite-state automata primitives use a finite surface 57 (to be described later) along with composite quasigroup isotopes 46 in the static entropy container 49 to generate the composite quasigroup isotopes 46 that are placed in the dynamic entropy container 56.

Low-level primitives are polymorphic primitives that are associated with one or more other polymorphic primitives; usually performing a subordinate role as part of a k-ary tree abstraction. These could compile to a just few machine-code instructions, or could have deep k-ary tree abstractions beneath them. Like all polymorphic primitives, a single one could form Control associations with a number of other primitives.

The metamorphic compiler facilitates that all the polymorphic primitives including these have some roll in diffusing the state or the control-flow of the encoded algorithms. Because of this primitives become inter-dependent; and as such tampering with any part of an executing metamorphic algorithm even by the alteration of a single bit will cause the entire algorithm to produce invalid results in a manner according to the strict avalanche criteria. Software guards are encoded and compiled to specifically protect other primitives as they receive input, execute, transform data and produce output.

The term "primitive" and "polymorphic primitive" generally refers to any of the types of primitives and their polymorphic variations, some or all of which carry out functional components of the cipher.

Figure 6:
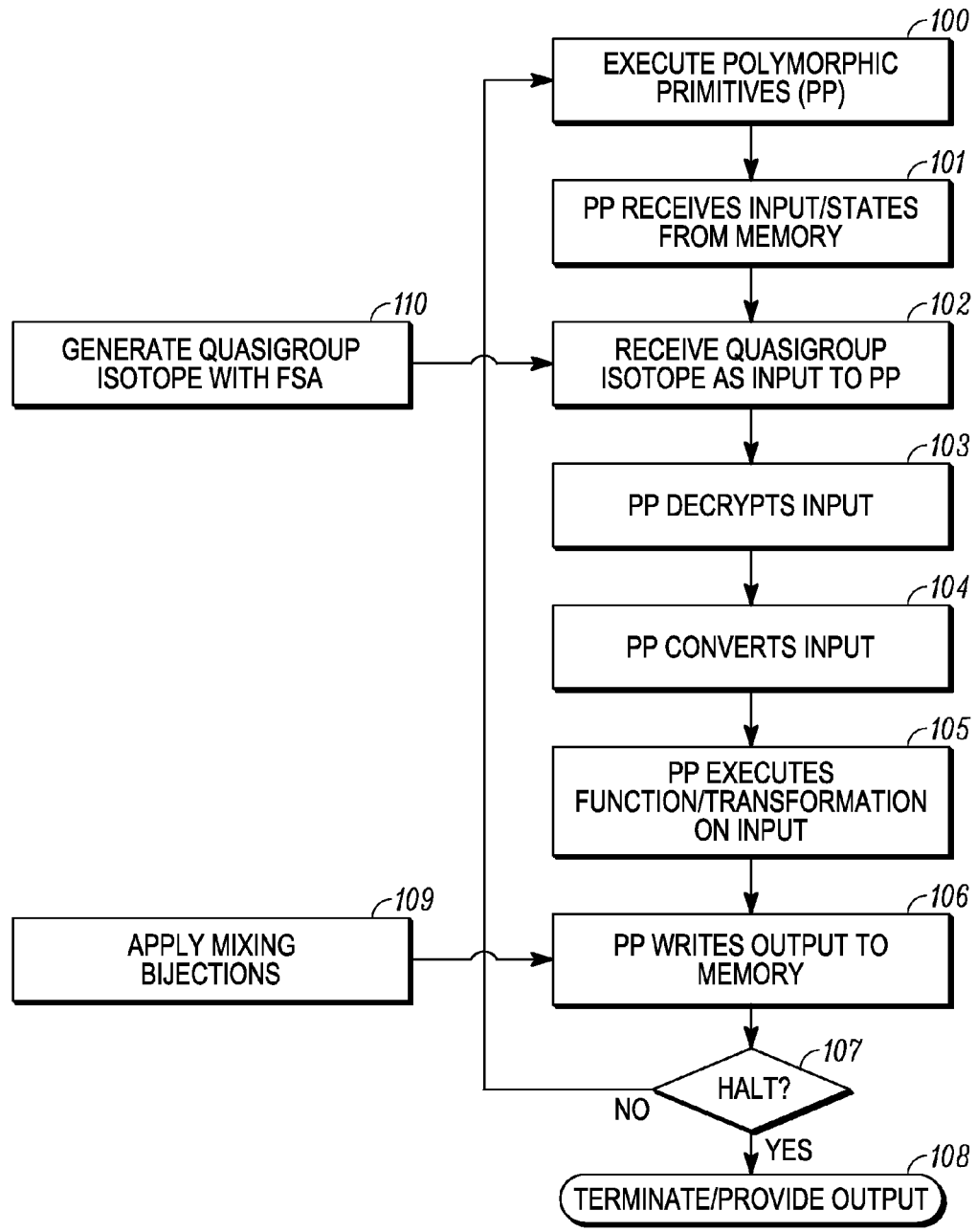
FIG. 6 is a flow diagram of the execution of the metamorphic algorithm.

The third, execution, stage, step 32, comprises shipping the cipher kernel 47 to the target apparatus/host 20 and the dynamic execution 32 of the compiled cipher kernel on that apparatus 20 which generates/implements the metamorphic algorithm, which itself implements the underlying cryptographic algorithm 12. FIG. 6 shows the general steps of execution in more detail. These will be described in more detail later with respect to the execution of an XOR function for the AES-CBC cryptographic algorithm. However, a general overview is given here.

Referring to FIG. 6, at a random interval one (or more) polymorphic primitives of a given primitive may (or may not) be executed, step 100. Execution occurs recursively, whereby hierarchies of polymorphic primitives each call/execute each other in a non-sequential and/or parallel manner. Each polymorphic primitive can execute repeatedly. The execution of polymorphic primitive comprises the writing of pre-coded handles and internal states (output) to the dynamic entropy container (DEC) 56 and calling the dynamic executor primitive 55 which controls the dynamic execution, and is encoded into the primitive at compile time. The polymorphic primitives may execute one or more other polymorphic primitives at any point during the execution. This results in dynamic execution of the metamorphic algorithm 24, and also the use of the polymorphic primitives in that dynamic execution creates polymorphism. Primitives do not perform blocking calls.

The entropy container 56 is a construct defined by virtual pointers created by the compiler to provide a place to store output states from polymorphic primitives. The virtual pointers appear to be memory addresses but encode logical references that bear no obvious relationship to physical memory. By using virtual pointers, one or more layers of indirection are created, which hide the location in memory of the states (input and output) of polymorphic primitives and create cryptographic diffusion.

Upon execution, a polymorphic primitive 43 reads as input an arbitrary series of locations in memory (dictated by its internal state and the cryptographic context—set by the composite quasigroup isotope for the layer), step 101. These memory locations contain the output (states) from other polymorphic primitives, or data from files, keyboard input, networks or other data sources. In a parallel process, state encryption is implemented such that the output (states) from polymorphic primitives are stored in memory in an encrypted form, the encryption of any output being based on the cryptographic context (composite quasigroup isoptope 46) relating to the layer of the respective polymorphic primitive the output comes from.

The cryptographic context is determined by the composite quasigroup isotope that is generated, step 110, by a respective finite-state automata primitive 52. That composite quasigroup isotope 46 is passed, step 102, to the polymorphic primitive. This is used by the polymorphic primitive to decrypt the inputs to the polymorphic primitive, step 103 (if those inputs are in encrypted form). This encryption creates cryptographic confusion.

The compiler 31 can also apply mixing bijections to the inputs outputs of each polymorphic primitive, see step 109, which are transformations that combine with the encryption of those outputs to create further cryptographic confusion. Therefore, in addition to decryption of the input, the polymorphic primitive performs a transformation of its input (encoded at compile time), step 104. This may or may not be based on its internal state. The polymorphic primitive performs a transformation of internal state (encoded at compile time)—that is, it executes its function, step 105. This may or may not be based on its inputs (which have been converted and decrypted, where necessary).

The polymorphic primitive writes output to an arbitrary series of locations in memory (dictated by its internal state and the cryptographic context) using the virtual pointers to create one or more layers of indirection, step 106. The output could be encrypted according to the cryptographic context of the polymorphic primitive determined by a respective composite quasigroup isotope. At this point, the mixing bijection is also applied to the output via the compiler, step 109. Most of the time, the input will be invalid, and as a consequence the output from a polymorphic primitive 43 will be invalid. The input can be invalid for various reasons. For example, if input read is invalid output from a parent polymorphic primitive is invalid. Also, if the cryptographic context of a polymorphic primitive is such that it cannot properly decrypt input, then that input is invalid, resulting in invalid output. It can also be invalid if the input is received from the wrong data source, for example the wrong polymorphic primitive. The polymorphic primitive 43 will have no information on whether or not its inputs and subsequent outputs are valid or not. The dynamic executor primitive 55 checks for a halting condition and either loops to step 100, or if the halting condition occurs, terminates and outputs resultant information, step 108, based on its internal state based and the a halting condition, step 107. The halting condition will be described in detail later. The resultant information is the encryption or decryption resulting from the output from one or more of the polymorphic code blocks.

Together, dynamic execution, the use of polymorphic primitives and the use of indirection results in a control abstraction, whereby the concept of an execution sequence is removed. This creates obfuscation, and diffusion. Data and control flow are not passed between polymorphic primitives 43. The state encryption and mixing bijections provide a further layer of confusion. The dynamic execution causes maximal decoupling of all elements of the executing program such that execution order, control pathways and state transformations follow a non-deterministic flow based on cryptographically secure composite quasigroup operations. Furthermore, the design allows for maximal overloading (polymorphism) as well as the ability to overlap several cryptographic and obfuscatory mechanisms simultaneously. It is worthwhile to point out that algorithms encoded into a metamorphic algorithm, include the algorithms that control the metamorphic algorithm itself. All such algorithms are treated in exactly the same manner.

The cipher kernel 47 is itself a metamorphic algorithm 24, which means that it is constantly self-modifying as well as modifying the algorithms it encodes, such that no sequence executing code is likely to occur more than once, even if the same functions are being called repeatedly and the system is being scrutinized over a long period of time. By masking any code fingerprints or data footprints from manual or automated analysis in a white-box environment and causing a catastrophic failure mode even if a small number of bits are changed, a cipher kernel 47 provides obfuscation and tamper resistance of a metamorphic algorithm.

The result of this process is that during execution of the metamorphic algorithm 24, at least one of the polymorphic primitives 43 for each of the functional components 41 are repeatedly executed recursively in parallel and/or sequentially in any order. Upon execution, each polymorphic primitive 43 reads input and provides output. Sometimes the output is subsequently read as input by a child polymorphic primitive for a succeeding functional component. Most of these executions of polymorphic primitives result in invalid output, as in most cases:

the input to that polymorphic primitive is invalid,
the polymorphic primitive is in the wrong cryptographic state, and/or
the input comes from the output of a wrong polymorphic primitive or other data source.

A polymorphic primitive 43 for a functional component will not provide valid output until it has at least received valid input. That is, for a valid output for any polymorphic primitive 43 to occur that polymorphic primitive 43 must receive (as input from memory) valid output from an input source, such as a respective parent polymorphic primitive 43 for a preceding functional component 41 (which itself must have received valid output from its respective parent polymorphic primitive 43). As such, the underlying algorithm will not be executed and valid output will not be obtained until at least the following conditions occur:

a. a polymorphic primitive 43 has executed at least once for each functional component, and
b. the execution of each polymorphic primitive 43 is based on valid input.

Output might also be invalid if the polymorphic code block:

is in the wrong cryptographic state for decrypting the input, and/or
reads input originating from the wrong polymorphic code block.

The polymorphic algorithms will not know when they have reached a state corresponding to valid output. A halting condition (which will be described in detail later) determines when these conditions are met. Once the halting condition is met, it means a chain of successive polymorphic primitives 43 for each functional component 41 have each received/read valid input from memory and has provided/written valid output to memory, which results in the execution of the underlying algorithm.

This dynamic execution allows polymorphic primitives 43 to execute other primitives in a decoupled and temporally random order, such that polymorphic primitives of any part of an algorithm could be executed before or after any other part of an algorithm. Control flow is only preserved through the complex relationship between the cryptographic states of layer-based primitives through quasigroup isotopes generated by finite-state automata primitives and dynamic messages. The metamorphic algorithm 24 is a complex self-modifying execution of different variations of primitives in a non-linear order. This process makes it difficult to reverse engineer because of the following.

Each polymorphic primitive 43 for a functional component 41 has different control and data pathways. Even though they perform the same transformations, the do so in different ways, while implementing the same transformation.

A large number of combinations of the polymorphic primitives 43 are executed recursively repeatedly, in parallel and/or in any order (in an ad hoc manner.)

Most executions of a polymorphic primitives result in invalid output.

More particularly, execution of the cipher kernel 47 (resulting in execution of the metamorphic algorithm and underlying cryptographic algorithm) causes the encoded underlying cryptographic algorithm to be executed in a highly obfuscated fashion, which will only yield the desired results if the cipher kernel is being executed on a valid target host 20 and is not tampered with before or during execution. The executing algorithm is obfuscated by several overlapping primitives, including but not limited to: polymorphic execution; control abstractions; data abstractions; tamper resistance software guards; anti reverse-engineering software guards; compact cipher algorithms; junk instruction software guards and dynamic execution primitives. Each of these forms of protection is implemented built using the methods outlined in more detail below. Because of this interdependency, even the smallest change to any part of the process will result in a catastrophic propagation of an error state to all subsequent processes.

Detailed Description of Securing an Executable Program with Reference to AES-CBC Various aspects of the apparatus 20/33 and process 30-32 for constructing and implementing secure executable code embodying a cryptographic/cipher algorithm will now be described in more detail with reference to FIGS. 7 to 11. For exemplary purposes, the more detailed description of the apparatus 20/33 and process 30-32 will be described with reference to the AES-CBC cryptographic algorithm 60, although this should not be considered limiting in any way. The apparatus and process of implementing a cryptographic algorithm using a metamorphic algorithm could be applied to any type of suitable cryptographic algorithm.

Figure 7:
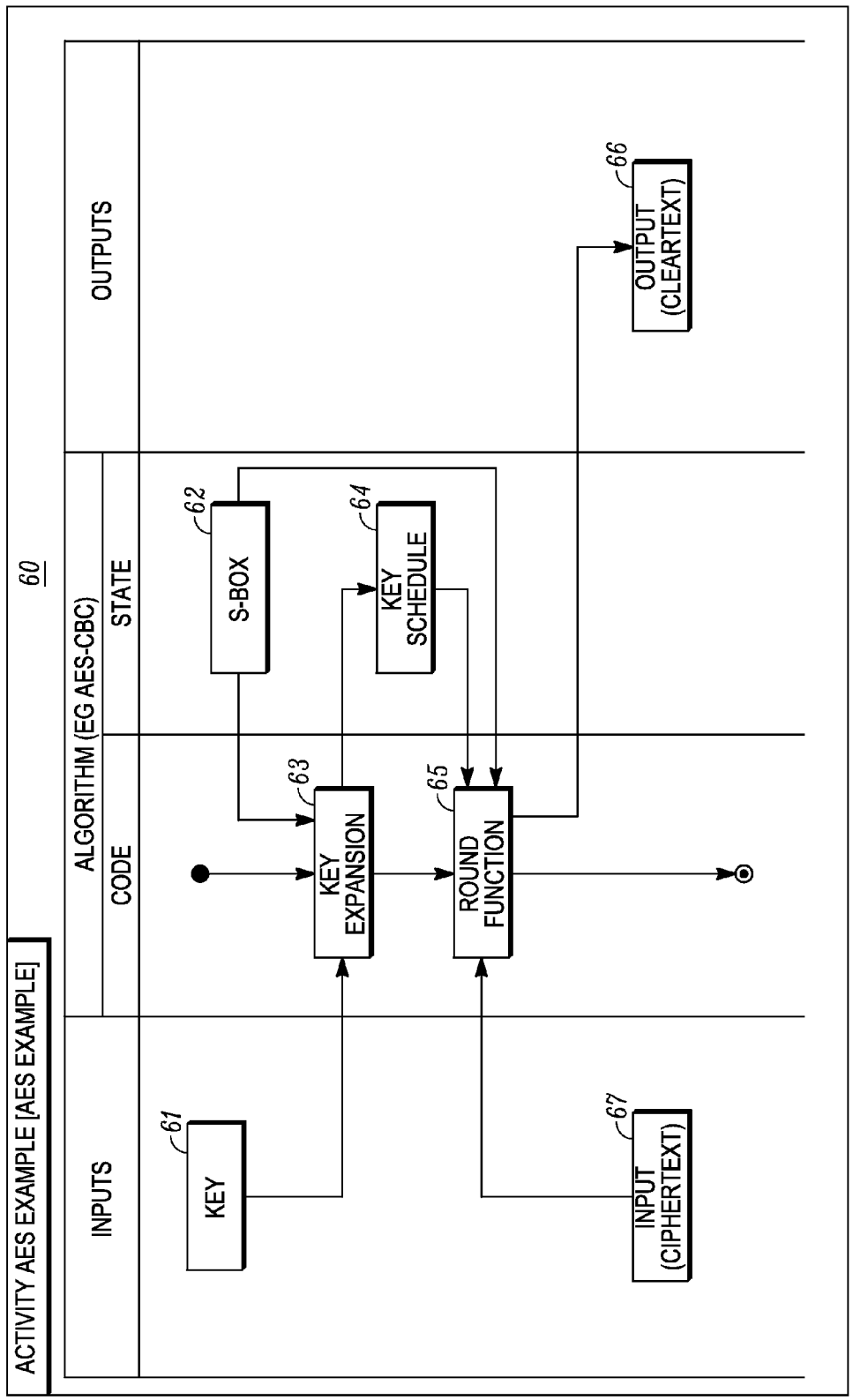
FIG. 7 is a block diagram of an AES-CBC cryptographic algorithm architecture.

FIG. 7 shows a typical implementation of AES-CBC 60 in software. The algorithm is known by those skilled in the art, so only a brief description will be set out here. A key expansion 63 function receives a key (e.g. decryption key) 61 and input from an S-Box 62. The output is processed in a key schedule 64. A round function 65 receives the output of the key schedule 64 and S-Box 62, and also receives information 67 for translation (such as ciphertext for decrypting) 67. Upon execution, the round function 65 outputs decrypted information (such as cleartext) 66.

In summary, to implement AES-CBC 60 using a metamorphic algorithm 24, the AES-CBC algorithm is encoded into a cipher kernel 47 along with keys and other state information to facilitate the decryption of a specific element of content on a specific host machine 20. The cipher kernel 47 is encoded to seek local state that only exists on a particular host 20; such that the decoding and execution of the cipher kernel 47 and the specific algorithm 60 it encodes will fail unless this state can be fully re-established through the lifetime of cipher kernel 47 execution. This provides another order of combinatorial security, by node-locking a particular instance of the cipher kernel and its encoded algorithm to a specific host. During initialization, the cipher kernel actively seeks state from a multitude of resources local to a particular host; incorporating this into successive quasigroup transformations.

Figure 11:
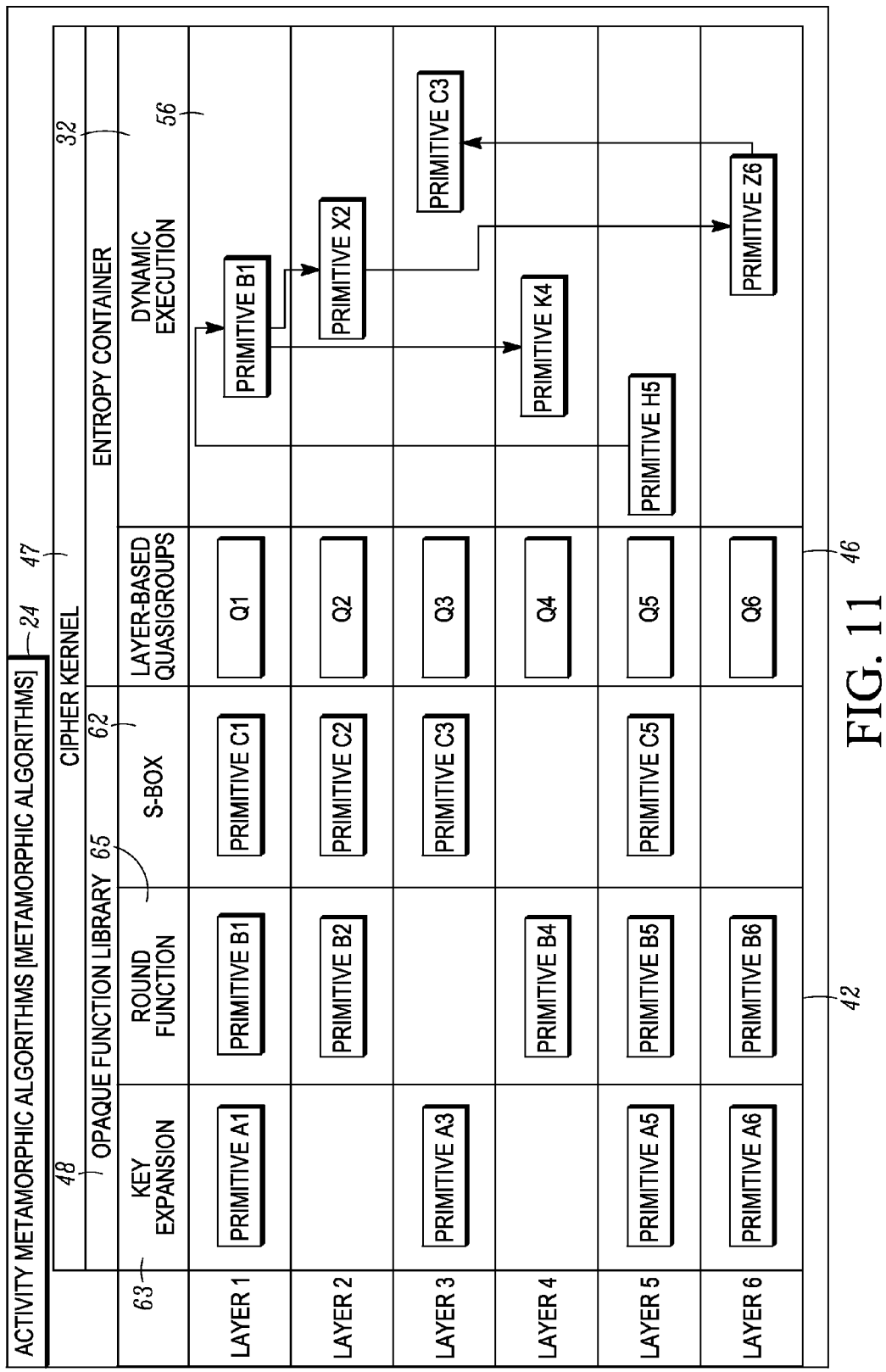
FIG. 11 is a block diagram of the cipher kernel architecture for the AES-CBC cryptographic/cipher algorithm.

This is used to progressively initialize a series of dynamic execution layers, which in-turn execute functionality (using polymorphic primitives assigned to those layers) in both succeeding and preceding execution layers. An example of this dynamic execution 32 is shown in FIG. 11 in the dynamic entropy container 56. This non-linearity of execution provides another order of security amplification by imposing both obfuscation and sensitivity to tampering. Each time the cipher kernel 47 executes, even though it will ultimately perform the encoded algorithm in a deterministic manner; its execution fingerprint and data footprint will remain non-deterministic. The correct application of the cryptographic principles of confusion, diffusion and unpredictability will ensure that an observer trying to correlate any element of the cipher kernel with the algorithms and secrets it encodes is a computationally infeasible task.

The construction 30, 31 and execution 32 of the metamorphic algorithm 24 that upon execution implements the underlying AES-CBC 60 cryptographic algorithm will now described. First, the construction of the architecture of the metamorphic algorithm 24 using the process outlined in FIGS. 8A, 8B will be described in relation to the architecture previously described with reference to FIG. 4. Note, the process in FIGS. 8A, 8B follows the construction process 30, 31 previously set out and described with reference to FIG. 3. Next, the execution 32 of that metamorphic algorithm 24 will be described. The resulting metamorphic algorithm 24 comprising the cipher kernel 47 is shown in FIG. 11.

Referring to FIGS. 4 and 8, in the development substage 34, the AES-CBC cryptographic algorithm 60 is broken down (decomposed or deconstructed), step 81, in a manual process (that is implemented on a processor e.g. 33, such as a computer system) into functional components (distinct functions) 41 that together perform the functionality of the algorithm 60.

Functional decomposition is the process of resolving a functional relationship into its constituent parts in such a way that the original function can be reconstructed (i.e., recomposed) from those parts by functional composition. The same principle applies equally to computational and mathematical algorithms. Here is described a method synergistic to both.

For a multivariate function $y=f(x_1, x_2, \ldots x_n)$, functional decomposition is the process of identifying a set of functions such that:

$$y=f(x_1, x_2, \ldots x_n)=\Phi(g_1(x_1, x_2, \ldots x_n), g_2(x_1, x_2, \ldots x_n), \ldots G_m(x_1, x_2, \ldots x_n))$$

Where $\Phi$ represents a composition function. Thus we can say that function $\Phi$ is decomposed into functions $\{g_1, g_2, \ldots g_n\}$. This process is intrinsically hierarchical in the sense that we can seek to further decompose the functions of $g_i$ into constituent functions hi in the same manner as above.

Figure 9:
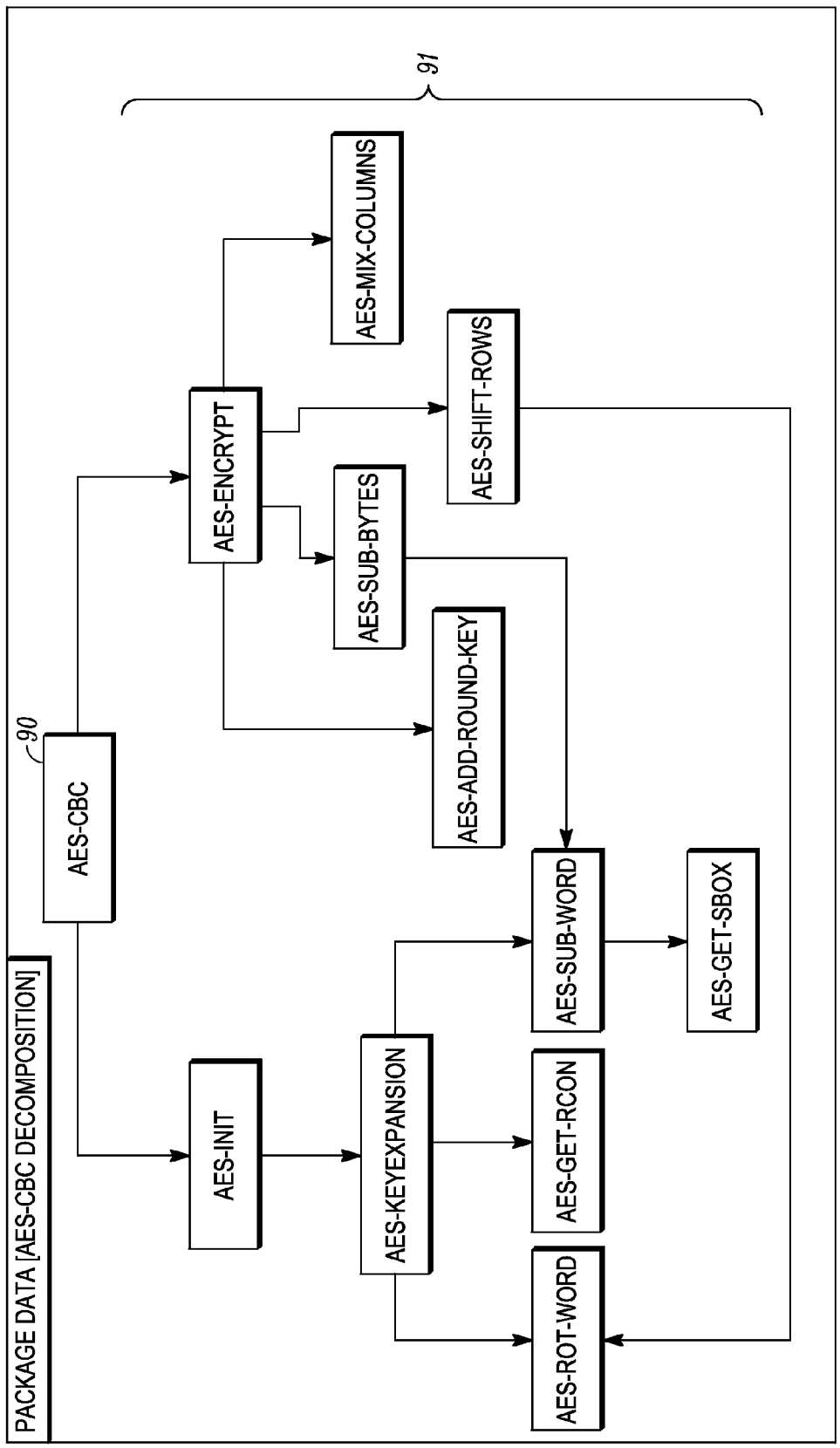
FIG. 9 is a block diagram showing functional components of the metamorphic algorithm for the AES-CBC cryptographic/cipher algorithm.
Figure 10:
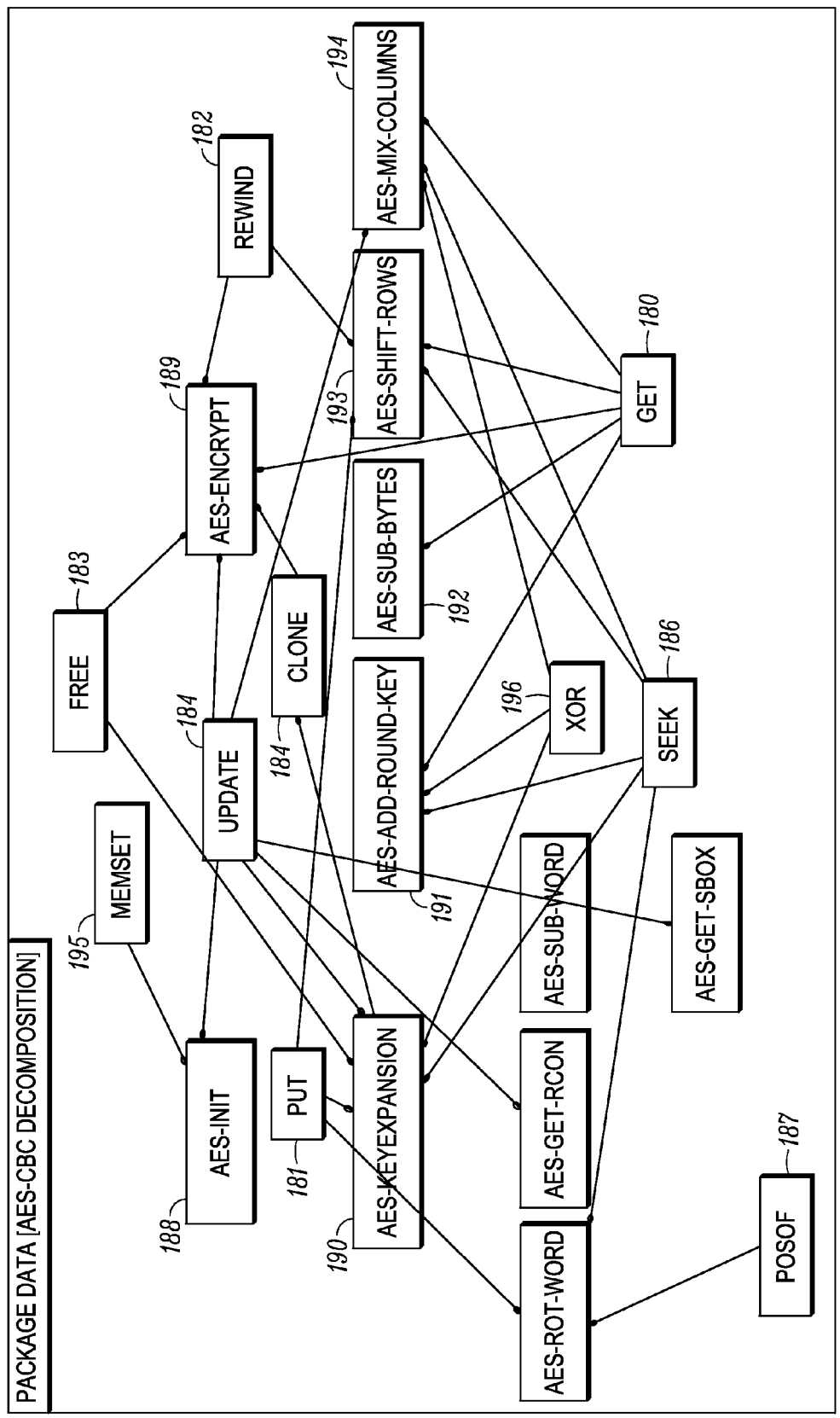
FIG. 10 is a block diagram showing polymorphic primitives of the metamorphic algorithm for the AES-CBC cryptographic/cipher algorithm.

In FIGS. 9 and 10 is an example functional decomposition of the AES-CBC algorithm. It shows decomposed functions and the resulting primitives—control abstraction primitives that form the control flow the algorithm. Such relationships between primitives are termed control abstractions and although not strictly hierarchical, they generally fall into the shape of a k-ary tree.

FIG. 9 shows a simplified (for exemplary purposes) functional decomposition of the AES-CBC 60 algorithm into a t-ary tree. It illustrates the incorporation of control and state abstractions and software guards into the AES-CBC algorithm. The tree comprises a top-level AES function 90, which itself can be broken down into a hierarchy of component functions (generally shown as 91). The nature of the functional components 90, 91 will be described later below with respect to FIG. 10 in relation to description of the polymorphic primitive abstractions of those functional components.

Referring back to FIGS. 8A, 8B, each functional component is then abstracted, step 83, into at least one primitive 42. An abstraction relates two or more elements that represent the same concept from different viewpoints. An example of the code for one primitive, the AES round function primitive (AES-ROUND) is:

```
OPAQUE_FN(AES_ENCRYPT,VARIATION_1 ,PARAM_2,
SecureHandle in _ handle, SecureHandle cs_handle)
{
ASSERT(in _ handle);
ASSERT(cs_handle);
REWIND(in_handle);
CipherState * cs = (CipherState*)GET(cs_handle, sizeof (CipherState));
ASSERT(cs) ;
ASSERT(cs->aes.ks _handle);
// The state array is the same as the output
i f ( cs->aes.out _handle)
FREE_HANDLE(cs->aes.out _handle);
Cs->aes.out _handle = CLONE_HANDLE(in_handle);
REWIND( cs->aes.out_handle);
UPDATE(cs _handle, (SecureHandle ) cs, sizeof(CipherState));
s32 round = 0 ;
// Add the First round key to the state before starting the rounds.
REWIND( cs->aes.out _handle);
ADDROUNDKEY(cs_handle, round);
// There will be Nrrounds .
// The first Nr-1 rounds are identical.
// These Nr-1 rounds are executed in the loop below .
for (round =1; round <AES_Nr ; round ++)
{
REWIND( cs->aes.out _handle);
SUBBYTES(cs _handle, round);
REWIND( cs->aes.out _handle);
SHIFTROWS(cs_handle , round);
REWIND( cs->aes.out_handle);
MIXCOLUMNS(c s _handle, round);
REWIND( cs->aes.out _handle) ;
ADDROUNDKEY(c s _handle, round);
}/
/ The last round is given below .
// The MixColumns function is not here in the last round .
REWIND( cs->aes.out _handle);
SUBBYTES( c s _ h a n d l e , round ) ;
REWIND( cs->aes.out _handle);
SHIFTROWS(cs _ handle, round);
REWIND( cs->aes .out_handle);
ADDROUNDKEY(cs_ handle, AES_Nr ) ;
return cs->aes.out _handle;
}
```

The example primitive is an abstracted AES round function primitive (AES-ENCRYPT) utilizing both control and state abstractions. The relationships between the AES-ENCRYPT primitive and associated primitives generated by this process are illustrated in 10, and relate to the abstracted functions shown in FIG. 9.

The AES-CBC primitive in this example above is a top-level primitive, under which there is a tree of many associated primitives. As a top-level primitive, AES-CBC receives external inputs, writes them as internal outputs. Further it has an encoded halting condition, which when met enables the primitive to emit its results back to its caller as would a regular function. top-level primitives have this property.

A further, polymorphism, step is then undertaken, step 85, in which each primitive 84 is coded into a plurality of polymorphic variations 43, resulting in a set of polymorphic primitives 43 for each functional component 41. Each polymorphic primitive in a set for a functional component carries out the same function but in a different manner.

Primitives are abstractions that decouple control and data; and as such can be extended polymorphically. A security amplification can therefore be introduced by the creation of polymorphic primitives, which exhibit the same behavior but have differing control fingerprints and data footprints.

To understand the complexity that polymorphism introduces, consider the AES-CBC 60 example in FIG. 10 as a t-ary tree multi-permutation of four polymorphic primitive variations t=4 of each primitive with n=22 nodes. A t-ary tree is said to be rooted if it has a single root; regular if every internal node has t children; and ordered if the sub trees of each internal node can be identified. Let T(t,n) be a set of t-ary trees with n nodes. Further, let Ti denote the ith sub tree of T belongs to T(t,n). The table below illustrates a lexicographic order of such t-ary trees and shows the resultant control and data permutations of valid grammars.

|  | Self | ES Primitives | Guards | Accessors | Variations | Permutations |
|---|---|---|---|---|---|---|
| AES-CBC | 1 | 2 | 4 |  | 2401 | 2.4E+03 |
| AES-INIT | 1 | 1 | 13 | 2 | 83521 | 2.0E+08 |
| AES-KEYEXPANSION | 1 | 3 | 5 | 5 | 38416 | 7.7E+12 |
| AES-ROT-WORD | 1 |  | 2 | 3 | 1296 | 1.0E+16 |
| AES-GET-RCON | 1 |  | 1 | 1 | 81 | 8.1E+17 |
| AES-SUB-WORD | 1 | 1 | 1 |  | 81 | 6.6E+19 |
| AES-GET-SBOX | 1 |  | 1 | 1 | 81 | 5.3E+21 |
| AES-ENCRYPT | 1 | 4 | 4 | 5 | 38416 | 2.0E+26 |
| AES-ADD-ROUND-KEY | 1 |  | 4 | 3 | 4096 | 8.3E+29 |
| AES-SUB-BYTES | 1 | 1 | 3 | 1 | 1296 | 1.1E+33 |
| AES-SHIFT-ROWS | 1 | 1 | 3 | 4 | 6561 | 7.1E+36 |
| AES-MIX-COLUMNS | 1 |  | 3 | 4 | 4096 | 2.9E+40 |
| ASSERT | 1 |  |  |  | 1 | 2.9E+40 |
| MEMSET | 1 |  | 1 |  | 16 | 4.7E+41 |
| FREE | 1 |  | 1 |  | 16 | 7.4E+42 |
| PUT | 1 |  | 1 |  | 16 | 1.2E+44 |
| UPDATE | 1 |  | 1 |  | 16 | 1.9E+45 |
| CLONE | 1 |  | 1 |  | 16 | 3.0E+46 |
| REWIND | 1 |  | 1 |  | 16 | 4.9E+47 |
| XOR | 1 |  | 1 |  | 16 | 7.8E+48 |
| GET | 1 |  | 1 |  | 16 | 1.2E+50 |
| SEEK | 1 |  | 1 |  | 16 | 2.0E+51 |
| POSOF | 1 |  | 1 |  | 16 | 3.2E+52 |

In summary, a simple 4-ary polymorphic tree represents an exponential expansion of $3\times10^{52}$ or $2^{174}$ possible execution and data pathway permutations: A computationally intractable problem for fingerprinting or footprinting algorithms.

Each polymorphic primitive 43 of a set is a code block that implements the functionality of the respective functional component. Each polymorphic primitive has differing control and data pathways to the other polymorphic primitives in the set, but when executed, all polymorphic primitives for a particular functional component produce identical transformations. That is, the polymorphic primitives are functionally equivalent, yet due to their composition have purposefully differing implementations of program code and internal states. Polymorphic primitives typically perform specific substitutions and permutations; but are not limited solely to mathematical operations. For example, data abstractions software guards and I/O primitives are also incorporated.

At this point, the polymorphic primitives are mapped to a particular layer 44 by the opaque function/context map 45, which is hand-built at development time. The layers facilitate that polymorphic variations of the same primitive do not share the same cryptographic context and that the control flow from one polymorphic primitive to the next results in a shift of the cryptographic context; which, because of the periodicity of the finite-state automata primitives 52 (to be described below) generating the layer-based contexts, forces a non-linear decoupling of control flow by the control abstraction primitives. The same mechanisms apply to data stored in the dynamic entropy container 56 by the data abstraction primitives. The layers facilitate layer based execution which introduces the cryptographic principles of confusion and diffusion into the metamorphic algorithm.

The encoding process facilitates that both control abstraction 50 and data/state abstraction primitives 53 are sufficiently diffused through multiple execution layers to achieve maximal confusion and diffusion and thus an optimum workfactor. Each polymorphic primitive 43 is opaque in the sense that it can only be decrypted by other polymorphic primitives with layer-specific quasigroups; where no two variants of the same primitive share the same execution layer or cryptographic context.

Figure 8A:
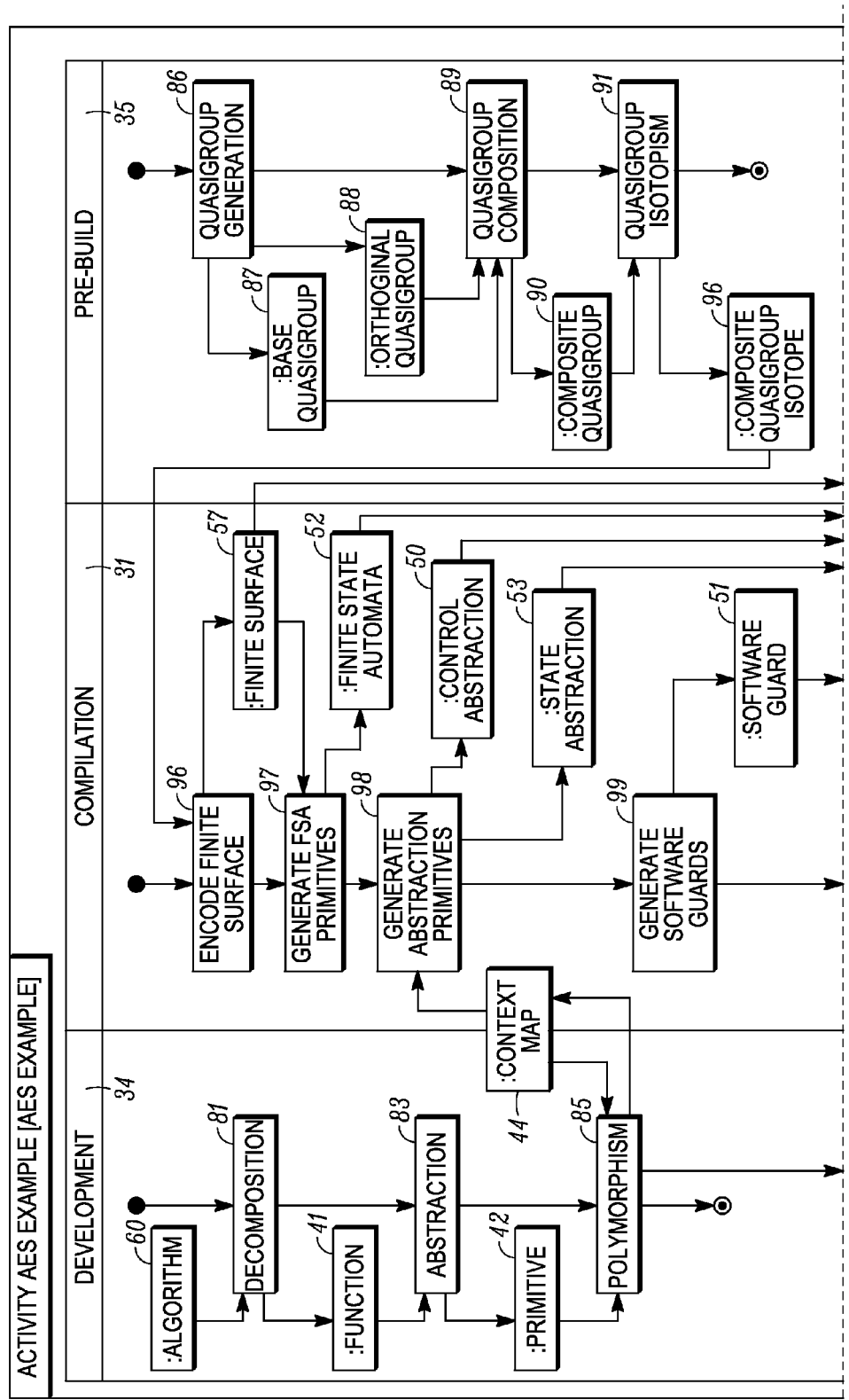
FIGS. 8A, B show a flow diagram of the construction of a metamorphic algorithm for the AES-CBC cryptographic/cipher algorithm.
Figure 8B:
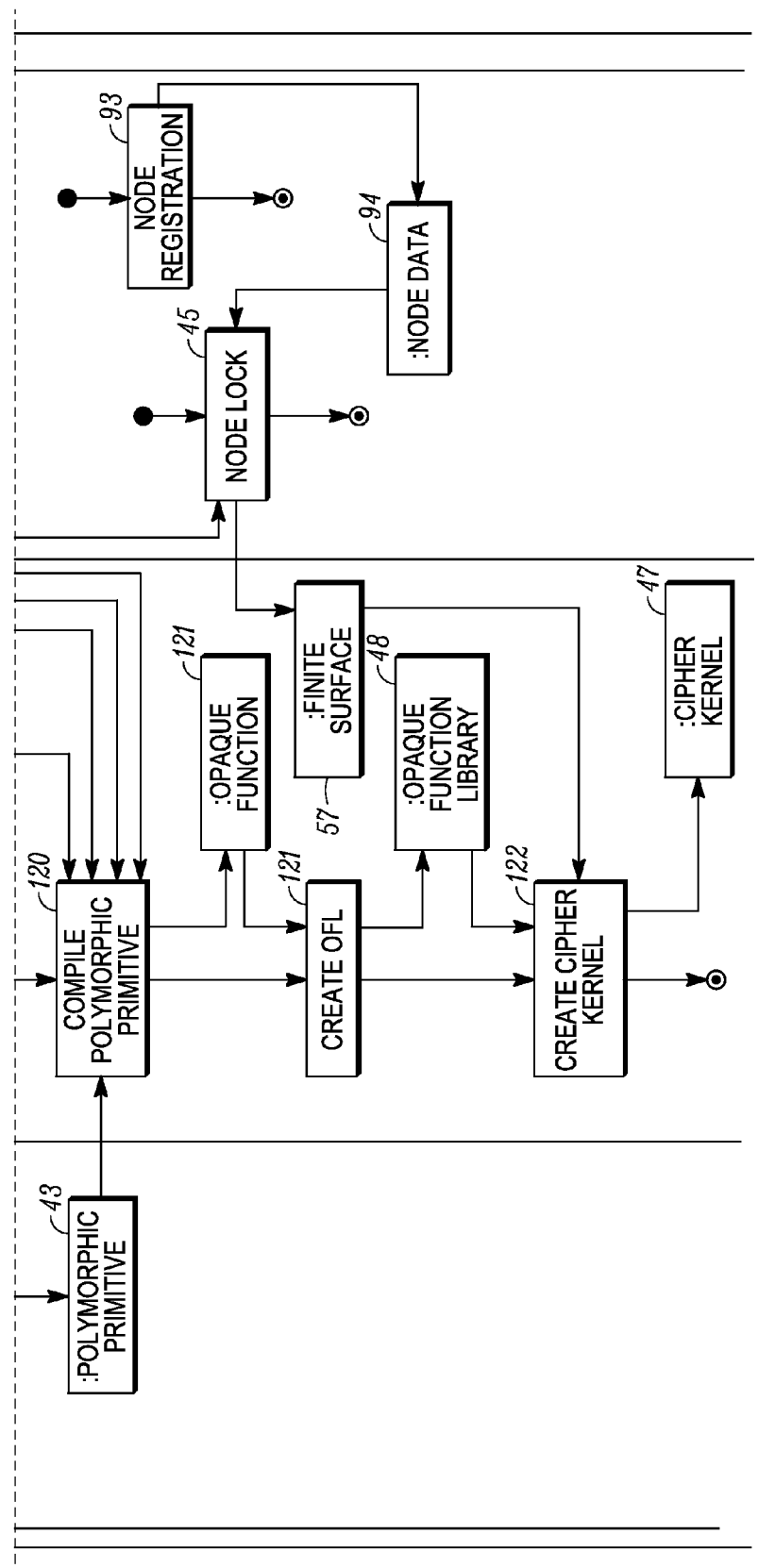

Still referring to FIGS. 8A, 8B, next is the pre-build substage 35, a process that generates the unique set of composite quasigroup isotopes 46 that can be used to encode a series of cipher kernels. This is carried out on the processor 33 shown in FIG. 3. For efficiency, this process may be carried out infrequently; or for added security it can be carried out each time a specific cipher kernel is built.

First, the generation/construction of a cryptographically secure base quasigroup 87 and an orthogonal quasigroup 88 takes place, step 86. Next a composite quasigroup 90 is created from the base and orthogonal quasigroups, step 89. Then composite quasigroups that are isotopic to a base composite quasigroup are created, step 91, resulting in a composite quasigroup isotopes 46. As mentioned previously, quasigroup isotopes are used as keys to encrypt the states (inputs/outputs) of polymorphic primitives and are placed in the static entropy container 49.

The pre-build substage 35 also comprises node locking, step 95, the cipher kernel to a target host using node data 94 created from a node registration process, step 93. This prevents the metamorphic algorithm executing on an invalid host machine 20.

Next is the build stage, step 31. This involves the construction/compilation of the unique cipher kernel 47 for a particular target host 20 that encodes the metamorphic algorithm 24 from the static components. Part of this process comprises the generation of the finite surface 57, step 96, to be used as input for the finite-state automata primitives 52. The process also comprises the generation of the finite-state automata (FSA) primitives 52, step 97. Finite-state automata are polymorphic primitives generated at build time by the compiler. They are used to generate the non-linear multi-quasigroups in the dynamic entropy container 56, which are used by polymorphic primitives 43 to establish a layer-based cryptographic state. When executed, finite-state polymorphic primitives read their input from an initially uniformly random static entropy container 49 (the finite surface 96) and write output to the larger dynamic entropy container 56.

During execution, the finite-state automata primitives 52 use input from the finite surface 57 to generate the composite quasigroup isotopes 46, that are passed to the dynamic entropy container 56. These composite quasigroup isotopes comprise Qb, and Qs. Qb is a generated base composite quasigroup sampled from the pre-build process and that is encoded into the static entropy container. It is not recovered by the inverse (decoding) process during the execution of a metamorphic algorithm. Qs is an autotopic (random isotope of Qb) secret quasigroup and is the secret quasigroup used by compact cipher primitives to decrypt polymorphic primitives in the opaque function library. This quasigroup isotope and its associated cryptographic state is not recovered during the execution of a metamorphic algorithm. These quasigroup isotopes are used as keys to encrypt and decrypt input and output used by the polymorphic primitives variations, in a manner to be described in further detail later. The finite-state automate primitives 52 are also used in the node-locking of the cipher kernel 47 to a particular host without the need for a hardware-based solution. They encode the target host/apparatus 20 state into the static entropy container 49.

Next, abstract polymorphic primitives are generated, resulting in control abstraction 50 and state/data abstraction polymorphic primitives 53, step 98. The polymorphic primitives 43 do not pass control flow or data between themselves. This produces the decoupling that allows for the polymorphic primitives to be executed in an ad hoc manner in any sequence and even in parallel. The control abstraction and state abstraction primitives 50, 53 control execution of the polymorphic primitives 43 in light of the absence of control flow and data passing between polymorphic primitives.

Next, software guard primitives 51 are generated, step 99. Software guards implement anti-reverse engineering, tamper protection algorithms, junk instructions and a range of other generic obfuscation mechanisms. From a security standpoint data abstractions are created to remove correlations between state and process; and control abstractions are implemented such that anti-tamper, anti-reverse-engineering and anti-debug software guards can be introduced in every executable section of a cipher kernel.

The abstraction process creates primitives that correlate to the functional blocks in FIG. 9. A simplified set of the resulting primitives from the abstraction process and their relationships for the AES-CBC cipher is shown in FIG. 10. FIG. 10 is exemplary and those skilled in the art will appreciate it is not exhaustive of the types of primitives that could be created.

Software Guard Primitives

ASSERT (not shown in the diagrams as software guards are associated with all primitives) implements tamper resistance, anti-debug and anti-RCE protection software guard primitives.

Data Abstraction Primitives

GET 180 requests data from a secure handle (from the dynamic entropy container) used by primitives to securely read input.

PUT 181 writes a block of data to a secure handle used by primitives to securely write output.

REWIND 182 resets a secure handle to its origin point.

FREE 183 releases a secure handle.

UPDATE 184 updates data in a secure handle.

CLONE 185 duplicates a secure handle.

SEEK 186 move to a position inside a secure handle.

POSOF 187 identifies the current position inside a secure handle.

Control Abstraction Primitives

AES-INIT 188 sets the cipher in a state ready to encrypt or decrypt.

AES-ENCRYPT 189 the AES round function primitive.

AES-KEYEXPANSION 190 are primitives to generate the AES key schedule.

AES-ADD-ROUND-KEY 191 securely implements the AES function of the same name.

AES-SUB-BYTES 192 securely implements the AES function of the same name.

AES-SHIFT-ROWS 193 securely implements the AES function of the same name.

AES-MIX-COLUMNS 194 securely implements the AES function of the same name.

AES-GET-RCON implements the AES Rcon function.

AES-SBOX-SUB implements the AES ByteSub function.

Software Guard Primitives

ASSERT (not shown in the diagrams)

Compact Cipher Primitives.

Q_ENCRYPT encrypts state at a secure handle using the secure handle as a key and the current layer based cryptographic state as a quasigroup cipher.

Q_DECRYPT decrypts state at a secure handle using the secure handle as a key and the current layer based cryptographic state as a quasigroup cipher. The layer based state must be a left-parastrophe of the state used to encrypt the state; as the quasigroup cipher cannot decrypt ciphertext with the quasigroup it was encrypted with.

Low-Level Primitives

MEMSET 195 securely performs the memory operation of the same name.

XOR 196 securely xor's the underlying data represented by two secure handles.

MEMCPY securely performs the memory operation of the same name

XOR will be described in detail below.

Other Primitives

Many primitives apart from those illustrated in FIG. 10 are also executing inside a metamorphic algorithm. These primitives work in parallel with control and state abstraction primitives to provide overlapping security and obfuscation.

Referring back to FIGS. 8A, 8B, the processor then compiles 120 the polymorphic primitives 43 relating to the functional decomposition, software guard primitives 51, state abstraction primitives 53, control abstraction primitives 50 and FSA primitives 52 resulting in opaque functions 121. These are placed in the opaque function library 48, which is also generated by the compiler, step 121.

The cipher kernel 47 is created, step 122, from the opaque function library 48 and the finite surface 47 in the state entropy container 49. Encryption is the construction of an opaque function library 48 from a series of polymorphic primitives 43 encrypted with layer-based isotopes of Qs.

In addition to the polymorphism resulting in the primitives above, there is also substitution. Up until this point the mechanisms a developer has of permuting control and data flow in the encoded algorithm have been described. Whereas permutation represents a linear mapping of control and data flow; substitution represents a non-linear mixing designed to act in combination with permutation to maximize cryptographic confusion and diffusion.

Control substitution in a metamorphic algorithm is guided by a layer-based map of primitives (and their polymorphic variations) to particular execution layers and ultimately the layer-based cryptographic states (that occur in a non-deterministic fashion during the execution of a metamorphic algorithm.) The developer can use this mapping, for example, to ensure that tightly coupled areas of an algorithm (such as loops) are diffused as much as possible through as many cryptographic contexts; maximizing control decoupling, temporal disassociation and non-linearity of an executing metamorphic algorithm. A corollary to this concept in traditional cryptography is the design of a s-box. State substitution is achieved by the use of compiler mixing transformations either manually created by the developer or automatically injected by the metamorphic compiler; such that multiple state transformations and encryptions occur over multiple cryptographic contexts; thus decoupling state from function in a temporally disassociated and non-linear manner. Such mixing transformations can be introduced into an algorithm via design of control abstraction primitives. An example in AES, is the merger of the ADD-ROUND-KEY and SUB-BYTES primitives into a single s-box operation by partial evaluation:

Let $K^r_{i,k}$ be byte (i,k) in the round key of round r (the 128-bit round key is a 4×4 array of bytes). For byte $a_{i,k}$ of the input state a of round r, the two transformations correspond to an application of the s-box $T^r_{i,k}$ that is defined by:

$$T^r_{i,k}(a_{i,k}) = S(a_{i,k} \otimes K^r_{i,k})$$

Let Mj be the 32×32 bit matrix that implements MIX-COLUMNS transformation MCj of column j, and let Mi,j be the eight successive rows 8i;8i+1 . . . 8(i+1)−1 of Mj. The output xi,k of $T^r_{i,k}$ contributes to exactly one column j of the output of round r. MCi,j(xi,k) XOR-ed with output column j, where MCi,j(xi,k)=xi,k·Mi,j.

The resulting cipher kernel 47 that implements the metamorphic algorithm 24 is shown diagrammatically in FIG. 11 for AES-CBC. AES-CBC comprises key expansion 63, round function 65 and S-Box 62. For each of these there are primitives for respective functional components 41 (of which only a small number are shown), each primitive representing myriad polymorphic primitives 43. The primitives 41 are in the opaque function library 48. The layer-based quasi-groups 46 are in the static entropy container 49. Once compiled, the cipher kernel 47 can be shipped to the target host and executed to execute the metamorphic algorithm to implement the underlying AES-CBC cryptographic algorithm.

The dynamic execution 32 describe previously with respect to FIG. 6 is represented in the dynamic entropy container 56, in a very simplified form in FIG. 11. It shows the overlapping and non-sequential execution and control flow/data transfer between polymorphic primitives. The complexity of the execution of even a small part of a tiny metamorphic algorithm is such that the diagram is necessarily representative of the entire process. The complex overlapping multi-permutations involved in execution of a metamorphic algorithm operates conceptually as follows. Each of the many hundreds of thousands of polymorphic primitives 43 executed recursively together in an ad hoc fashion. The sequence of execution of any one of the primitives could be in any order or in parallel. The fingerprint of each and every part of any block of machine code being executed within a primitive is different each time. There is no controller nor any inherent knowledge in any primitive of a "valid" operation.

There is an undetermined amount of time and processor cycles between any "valid" operation (even if it were known). No part of any executing algorithm bears any correlation to any other part, nor does it bear any correlation to any interim, initial or final states. This results in a vast array of inputs and outputs most of which are invalid, resulting in a large "signal to noise" ratio of valid inputs/outputs to invalid inputs/outputs. This makes analysis of the input/outputs to reverse engineer the underlying algorithm very difficult. Doing this increases security. There is no invariant code. The code will only successfully execute on a valid host machine (or identical clone of a valid host machine). The code will only successfully execute if it is not tampered with.

The construction and execution as described above will now be described in further detail. For exemplary purposes, the further detail of construction and execution will be described with reference to the XOR function/polymorphic primitive in FIG. 10. It will be appreciated that describing with reference to the XOR function is only for illustrative purposes and should not be considered limiting, and the reference to a single functional component/polymorphic primitive (rather than all for AES-CBC) is for reasons of clarity. The following description can be generalized to apply to any of the functional components of AES-CBC separately or in combination, and further can be generalized to the implementation of any functional components separately or in combination for any cryptographic algorithm. The description below also further illustrates all characteristics of the execution, including but not limited to, state encryption, mixing bijections, indirection, control flattening, and control abstraction facilitated by on dynamic execution, polymorphism and layer based execution.

Referring to FIG. 10, the AES-CBC abstraction comprises a simple function that performs one bitwise XOR and one bitwise NOT operation on input values a;b producing an output value c. Programmatically it could be written (in C) as:

```
int nxor (int a, int b)
{
    int c = ~ ( a ^ b );
    return c;
}
```

Mathematically this algorithm can be viewed as:

$$s_1 = a \oplus b$$

$$s_2 = -0 - s_1$$

$$c = s_2$$

Prior to execution, the first task of creating a metamorphic algorithm is to break down this algorithm into sub functional components 41, step 81 and abstracting them to primitives 42, step 83. (note, this XOR/NOT functional component forms part of the entire AES-CBC cryptographic algorithm, so it is assumed for this example that decomposition of that algorithm has already taken place to reach the XOR/NOT functional component.)

Primitives are very low-level transformations and instructions. It is evident that this simple function has at least two primitives: one ($P_2$) that handles the XOR operation and one ($P_3$) that handles the bitwise NOT. A third primitive could be said to represent the function itself, which we denote as the top-level primitive $P_1$. This illustrates the hierarchical nature of functional/primitive deconstruction.

From this we can represent the algorithm as the following recurrence relation:

$$c = P_1(a,b) = P_2(a,b) \circ P_3$$

Yet another way of looking at this is:

$$c = P_1(a, b) = (a, b) \xrightarrow{P_2} s_1 \xrightarrow{P_3} s_2$$

If this was being executed using prior art methods, a processor would execute a program made up of these three primitives $P_1$, $P_2$, $P_3$ in sequence, passing whatever state between each primitive via stack or heap operations; and finally returning to output the final value from the top-level primitive. As discussed earlier, this kind of structure and behavior makes a computer algorithm prone to white box analysis. Therefore, to implement this part of the algorithm more securely, various layers of protection will be added into this algorithm in accordance with the method already described to illustrate how the process works.

Prior to describing the execution of this function in more detail, characteristics of the execution will be revisited in more detail. First, the algorithm undergoes dynamic execution. Because the algorithm is carved up into primitives, each representing only a handful of machine code instructions, the call sequence can be decoupled entirely, such that there is no connection or sequence between the called/executed primitives. To do this decoupling, the same secure handles used to decouple state in the data abstraction primitives (indirection, state encryption and mixing bijections) can be used to decrypt the primitives $P_1$, $P_2$ and $P_3$ themselves into the entropy container prior to execution.

The executing algorithm demonstrates polymorphism. One more layer of obfuscation is added by the creation of a plurality interchangeable blocks of code (polymorphic primitives) for each primitive. If a primitive is considered as a few machine code instructions that perform a specific transformations on state inside an entropy container; then a polymorphic primitive a different block of code that performs the same transformations but with different instructions and/or control flow. An adversary then is not only is faced with correlating tiny blocks of ever-varying instruction code to the functions they represent inside an even larger algorithm—thus creating an ever-changing code fingerprint; but also totally different control paths introduced by combinations of different polymorphic variations. Example C code for adding polymorphism to a primitive is:

```
OPAQUE_FUNCTION(SecureHandle ENC_MIX_NOTMIX_ENC_handle , Variation _1 ,
SecureHandle MIn_handle ,
SecureHandle EIn_handle , SecureHandle s2e _ handle , SecureHandle MOut_handle ,
SecureHandle EOut_handle )
{
SecureHandle out _handle =
EXECUTE_OPAQUE(CHAINKEYMIXER_handle , EIn_handl e , MIn_handle , MOut_handle ,
EOut_handle ,
```

```
Not_handle, 1 / * Param * / , s2e _handle);
SecureHandle mixed_s2e_handl e = EXECUTE_OPAQUE( GET_handle , out _handle) ;
/ / Code to do it one way.
}
OPAQUE_FUNCTION( Se cur eHandl e ENC_MIX_NOTMIX_ENC_handle , Variation _2 ,
SecureHandle MIn_handle,
SecureHandle EIn_handle , SecureHandles 2 e _handle , SecureHandl e MOut_handle ,
SecureHandle EOut_handle)
{
SecureHandle out _handle =
EXECUTE_OPAQUE(CHAINKEYMIXER_handle , EIn_handl e , MIn_handle , MOut_handle ,
EOut_handle ,
Not_handl e , 1 / * Param * / , s2e_handle);
SecureHandle mixed_s2e_handle = EXECUTE_OPAQUE( GET_handle , out_handle);
/ / Code to do it another way.
```

Next there is indirection. Data is passed between polymorphic primitives, but it is done using indirection, which was briefly described earlier. Indirection is usually used to describe the way pointers in C or C++ reference actual objects in memory. The metamorphic compiler is able to create a special kind of indirection using virtual pointers into a construct called an entropy container (EC). These pointers appear to be memory addresses, but are actually encoded logical references that bear no obvious relationship to physical memory. Each time an element of secure state is referenced, a transformation is applied to both it and the handle referencing it by compiler generated State abstraction primitives; such that a series of partial transformations occur between any element of state being "used" by Control abstraction primitives. These transformations include combinations of elements discussed in previous sections, plus additional transformations; and may be used either in series or in parallel. Some transformations are set out below.

Keyed mixings are encryptions and decryptions of state based on a cryptographic context and the secure handle.

Linear and non-linear mixing bijections are parallel transformations of the state and low-level operations that will be applied to that element of state at some point in the future based upon the compilers complete knowledge of the encoded algorithm.

Non-linear mappings cause surjective and/or injective mappings between one or more elements of state and/or one or more primitives; such that no single secure handle represents a particular state in the original algorithm. This has the added benefit in of enabling elements of an algorithm to be parallelized being so as to maximally diffuse both state and control flow.

Compiler generated diffusion generates security through the compiler generating long chains of control abstractions that span a (usually large) numbers of other primitives to ensure that a maximal amount of diffusion and sensitivity to tampering is achieved. Due to the un-sequenced execution of a metamorphic algorithm; and the lack of knowledge of which functions are performing valid or invalid transformations on any element of state; and also because chains of partial transformations are purposefully chosen to be non-associative and non-commutative: the ability for an observer to follow even one step in a chain of partial transformations is greatly hindered. In our above example we can remove any physical memory addressing (including function parameters, stack, heap and return values) and instead replace these with secure handles. Possible C code for state abstraction for this example is:

```
SecureHandle P1 (SecureHandle a_handle , SecureHandle b _ handle)
{
SecureHandle s1e _ handle = P2 (a_handle, b_ handle);
SecureHandle s2e _ handle = P3 (s1e _ handle);
SecureHandle out _ handle = ENDKEYMIXER(M2_handle, E2_handle, 1 / * Param * /, s2e _handle);
SecureHandle return_handle = GET(out_ handle);
return return_handle;
}
SecureHandle P2 (SecureHandle a_handle , SecureHandle b _ handle)
{
SecureHandle s1e _ handle = XORMIX_ENC_MIX( a_handle , b_handle , M1_handle,
E1_handle);
return s1e _ handle;
}
SecureHandle P3 (SecureHandle s1e _ handle)
{
SecureHandle s2e _ handle = ENC_MIX_NOTMIX_ENC(M1 _handle , E1 _handle , s1e _handle,
M2_handle, E2_handle);
return s2e _ handle;
}
SecureHandle XORMIX_ENC_MIX(SecureHandle a_handle , SecureHandle b_handle,
SecureHandle MOut_handle , SecureHandle EOut_handle )
{
SecureHandle out_handle = NEWKEYMIXERCHAIN(MOut_handle , EOut_handle,
Xor_handle , 2 / * Params * /, a_handle, b _ handle);
mixed_a_handle = GET(out _handle);
mixed_b_handle = GET(out _handle);
return PUT(GET(mixed_a_handle )  ̂GET(mixed_b_handle));
}
```

```
SecureHandle ENC_MIX_NOTMIX_ENC(SecureHandle MIn_handle, SecureHandle
EIn_handle , SecureHandle s2e_handle,
SecureHandle MOut_handle , SecureHandle EOut_handle)
{
SecureHandle out = CHAINKEYMIXER( EIn_handle, MIn_handle, MOut_handle, EOut_handle,
Not_handle , 1 / * Param * /, s2e);
SecureHandle mixed_s2e_handle = GET(out_handle);
return PUT(~GET(mixed_s2e_handle));
}
```

There may be many layers of indirection applied both by the compiler and at runtime; and indeed the ultimate resolution of an actual memory address may be deferred until some other process or processes have added (or removed) layers of indirection. These pointers are called secure handles, and contain two main pieces of information—a 128 bit cryptographic context and a 128 bit GUID—both generated by the compiler. They do not contain any reference to an actual memory address. A simplified way of viewing these values as memory locators is to consider the cryptographic context as an input to a cipher's round function. The GUID we can consider to be a key. Let's define such memory locator as the following.

Let E be a compact cipher with (c,g) defined as input and key respectively such that:

Address=$ec$address+$(E(c,g))$mod $ec$size)

Further Let e E be able to be used as a stream cipher to encrypt and encrypt bytes at the actual memory location.

In our above example any physical memory addressing can be removed (including function parameters, stack, heap and return values) and instead replace these with secure handles. Special primitives called data abstraction primitives are used to store and retrieve encrypted state elements.

Given a secure handle, it is possible to pass state (output) values between polymorphic primitives variations with security, given that with mixing bijections and state encryption the actual values of any element of states are not revealed anywhere during execution at any time. An additional level of security can be added to this by utilizing polymorphic primitives that continuously change indirection such that physical outputs/elements are being rewritten with different encryption and in different parts of physical memory at all times. These primitives (in combination with dynamic execution primitives) are what gives the name "entropy container" —the large cyclic buffers used by the metamorphic algorithm. The physical memory is constantly being read and re-written with what appears to be uniformly random "static" during the execution of a metamorphic algorithm.

State encryption is used during execution for at least some polymorphic primitives. In prior art white box cryptography state (output) is able to be examined by scanning memory, CPU registers or input/output devices. As mentioned above, one precaution that can be taken is to encrypt the states (polymorphic primitive outputs) being dealt with inside the algorithm. That way, when the state is stored it will not resemble interim values expected to be output by the given algorithm. States $S_1$ and $S_2$ could be passed through additional encryption and decryption transformations as follows:

$$c = P_1(a, b) = (a, b) \xrightarrow{P_2} s_1 \circ E_1 \xrightarrow{P_3} s_2 \circ E_2$$

The equation shows two additional E-transformations on the interim state values $s_1$ and $s_2$. The compiler could then add an E transformation before a state value is written to memory and an $E^{-1}$ transformation after a value is read from memory. Possible C code for this is:

```
int P1 (int a, int b)
{
int s1e = P2 (a, b) ;
int s2e = P3 (s1e) ;
return DECRYPT(E2, s2e);
}
int P2 (int a, int b)
{
int s1e = ENCRYPT(E1, a ^ b);
return s1e;
}
int P3 (int s1e)
{
int s2e = ENCRYPT(E2 , ~DECRYPT(E1, s1e));
return s2e;
}
```

Another commonly used vector in white-box analysis is the examination of executable instructions in an attempt to piece together an algorithm based on the executable code. A white box analyst (adversary) may not know for example the value b as this could be some kind of secret the program is trying to protect. However if the analyst knows that the operation involved is XOR, and a known value is a; then he or she could examine the program code until they found an xor instruction that has a as a parameter. If they waited until this instruction executed they will eventually see the value b passed to it as an argument.

Mixing bijection is used during execution. Another commonly used vector in white-box analysis is the examination of executable instructions in an attempt to piece together an algorithm based on the executable code. A white box analyst may not know for example the value b as this could be some kind of secret the program is trying to protect. However if the analyst knows that the operation involved is XOR, and a known value is a; then he or she could examine the program code until they found an xor instruction that has a as a parameter. If they waited until this instruction executed they will eventually see the value b passed to it as an argument.

As mentioned previously, the metamorphic algorithm compiler can apply mixing bijections to the inputs and outputs of every primitive based on a pre-determined knowledge of the operation being performed by that primitive. Because the compiler also knows the encryption transformations being performed out the outputs of a primitive, the compiler could merge these two mechanisms together to generate code that does not appear to manipulate any expected state values. Possible example C code for a mixing bijection is:

```
int P1 (int a, int b)
{
int s1e = P2 (a, b);
int s2e = P3 (s1e);
CHAINKEYMIXER(M2, E2, 1 / * Param * /, s2e);
return M2. unmix (1);
}
int P2 (int a, int b)
{
int s1e = XORMIX__ENC__MIX(a, b,M1, E1);
return s1e ;
}
int P3 (int s1e)
{
int s2e = ENC__MIX__NOTMIX__ENC(M1, E1 , s1e ,M2, E2);
return s2e;
}
int XORMIX__ENC__MIX( int a, int b, Mixer MOut , Key EOut)
{
NEWKEYMIXERCHAIN(MOut , EOut , 2 / * Params * /, a, b);
mixed__a = MOut. mixXor ( 1 );
mixed__b = MOut. mixXor ( 2 );
return mixed__a ^ mixed__b;
}
int ENC__MIX__NOTMIX__ENC( Mixer MIn, Key EIn , int s2e ,
Mixer MOut , Key EOut )
{
``` ticular algorithm. Since most cipher algorithms are very well known and are well documented, this makes it easy for an adversary to wait for a series of known instructions to be executed, then to work back from that point and find out the associated input states; and/or work forward and find out the output states. A common obfuscation technique is to remove any specific knowledge of sequence from the code itself, and instead embed this into lookup tables. The current metamorphic algorithm uses control flow flattening is used in addition to offer dynamic execution, polymorphism and control abstraction as additional overlapping measures designed to greatly decrease the ability for an observer to fingerprint an algorithm based on code fingerprints and/or control flow.

The characteristics described above all combine to provide control abstraction during the execution of the metamorphic algorithm, which provides the various advantages mentioned previously and reiterated here. The polymorphic primitives and dynamic execution to remove the concept of sequence entirely. The ability to allow all primitives in a program to be executed randomly and in any sequence and even in parallel. Possible C code for this control abstraction is:

```
OPAQUE__FUNCTION( SecureHandle P1__handle , Variation__1)
{
SecureHandle caller__handle;
//Inserted by the compiler (in top-level-primitives)
const HC halting__condition = " \ xda \ xc5 \ xdb \ xee \ x4e \ x0e \ x04 \ xa0 \ x3c \ xf9 \ xdd \ xce
\ xbd \ xfb \ x c f \ x54 " ;
do
{
if (caller__handle = GET__CALLED(P1__handle))
{
PUT( P2__handle , P1__handle ,HASH( hash ,GET( P1 __handle ) ) ,GET( P1 __handle ) ,GET(
P1__handle) ) ;
}
if (GET__EQUALS( P2__handle , P1__handle))
{
PUT( P3__handle , P1__handle ,HASH( hash ,GET( P2__handle)) ,GET( P2__handle));
}
elseif (GET__EQUALS( P3__handle , P1__handle))
{
PUT(ENDKEYMIXER__handle , P1__handle ,HASH( hash ,GET( P3__handle)), M2__handle ,
E2__handle, 1 ,GET(P3__handle));
}
elseif ( GET__EQUALS(ENDKEYMIXER__handle , P1__handle))
}
PUT(caller __handle , P1__handle ,GET(GET(ENDKEYMIXER__handle ,
P1__handle ,HASH( hash ,GET( P3__handle)))));
}
} while (HOUSEKEEPING) ;
}
```

-continued

```
CHAINKEYMIXER( EIn, MIn, MOut, EOut , 1 / * Param * /, s2e);
int mixed__s2e = MOut. mixNot ( 1 );
return ~mixed__s2e;
}
```

The combination of indirection, with state encryption, mixing bijections and optionally junk instructions is more generally referred to as data abstractions.

Control flow flattening is used during execution. A white-box analyst may not precisely know the arguments being passed to executing instructions, but he or she may know the approximate sequence of instructions associated with a par- The metamorphic compiler knows the desired control flow and the required transformations an algorithm has to perform. Since data is not passed directly between primitives nor control flow passed, the primitives can be executed in any order and in parallel. All primitives need to do is to repeat their simple transformations ad nauseam for the metamorphic algorithm to be effective.

Because our metamorphic algorithm is carved up into primitives, each representing only a handful of machine code instructions, the call sequence entirely can be decoupled entirely. The same secure handles are used to decouple state in the state abstraction primitives (indirection, encryption and mixing bijections) to decrypt primitives themselves into the entropy container prior to execution. Possible C code for this dynamic execution is:

```
OPAQUE_FUNCTION(SecureHandle P1_handle , SecureHandle a_handle, SecureHandle b_handle)
{
SecureHandle s1e _ handle = EXECUTE_OPAQUE( P2_handle , a_handle , b_handle);
SecureHandle s2e_handle = EXECUTE_OPAQUE(P3_handle, s1e _ handle);
SecureHandle out_handle=
EXECUTE_OPAQUE(ENDKEYMIXER_handle , M2_handle , E2_handle , 1 / * Param * /,
s2e_handle);
SecureHandle return_handle = EXECUTE_OPAQUE( GET_handle , out_handle);
return return_handle;
}
OPAQUE_FUNCTION(SecureHandle P2_handle , SecureHandle a_handle , SecureHandle b_handle)
{
SecureHandle s1e_handle =
EXECUTE_OPAQUE(XORMIX_ENC_MIX_handle , a_handle , b_handle , M1_handle ,
E1_handle);
return s1e_handle;
}
OPAQUE_FUNCTION( SecureHandle P3_handle , SecureHandle s1e _handle)
{
SecureHandle s2e _handle =
EXECUTE_OPAQUE (ENC_MIX_NOTMIX_ENC_handle , M1_handle , E1_handle , s1e
_handle, M2_handle , E2_handle);
return s2e_handle;
}
OPAQUE_FUNCTION(SecureHandle XORMIX_ENC_MIX_handle , SecureHandle a_handle ,
SecureHandle b_handle,
SecureHandle MOut_handle , SecureHandle EOut_handle)
{
SecureHandleout_handle =
EXECUTE_OPAQUE(NEWKEYMIXERCHAIN_handle , MOut_handle , EOut_handle ,
Xor_handle ,
2 / * Params * /, a_handle , b_handle);
mixed_a_handle = EXECUTE_OPAQUE( GET_handle , out_handle);
mixed_b_handle = EXECUTE_OPAQUE( GET_handle , out_handle);
return EXECUTE_OPAQUE( PUT_handle ,
EXECUTE_OPAQUE( GET_handle , mixed_a_handl e) ^ EXECUTE_OPAQUE( GET_handle
mixed_b_handle));
}
OPAQUE_FUNCTION( SecureHandle ENC_MIX_NOTMIX_ENC_handle , SecureHandle
MIn_handle , SecureHandle EIn_handle,
SecureHandle s2e_handle , SecureHandle MOut_handle , SecureHandle EOut_handle )
{
SecureHandle out_handle =
EXECUTE_OPAQUE(CHAINKEYMIXER_handle , EIn_handl e , MIn_handle , MOut_handle ,
EOut_handle ,
Not_handle , 1 / * Param * /, s2e _ handle) ;
SecureHandle mixed_s2e_handle = EXECUTE_OPAQUE(GET_handle , out_handle);
return EXECUTE_OPAQUE(PUT_handle , ~EXECUTE_OPAQUE( GET_handle ,
mixed_s2e_handle));
}
```

Now, the steps of execution will be described in more detail with reference to the XOR function with reference to FIG. 6. Upon execution, the polymorphic primitives execute, step 100 and receive/read input (which itself might be encrypted and/or transformed) based on pre-defined secure handles, which identify specific memory locations. During execution, when a valid secure handle is decrypted, it is used by the dynamic execution primitives to decrypt and execute that particular polymorphic primitive (e.g. XOR) from the opaque function library 48, even though this polymorphic primitive may very likely be a junk instruction, or indeed the very last primitive in an algorithm. The polymorphic primitives write (possibly in encrypted form) output in the same manner, regardless of execution order, step 106. As mentioned above, the polymorphic primitives are mapped to a particular layer 44 by the opaque function map, which is hand-built at development time. The layers mean that polymorphic variations of the same primitive do not share the same cryptographic context and that the control flow from one primitive to the next results in a shift of the cryptographic context; which, because of the periodicity of the finite-state automata primitives 52 generating the layer-based contexts, forces a non-linear decoupling of control flow by the control abstraction primitives. The same mechanisms apply to data stored in the dynamic entropy container by the data abstraction primitives.

The composite quasigroup isotopes 46 determining the cryptographic context of a polymorphic primitive is generated by the finite-state automata primitives 57 using input from the finite surface. The quasigroup defined cryptographic context enables a polymorphic primitive upon execution to use the isotope to decrypt the input, and encrypt its output. That input/output might not be valid, and the quasigroup isotope may or may not correctly decrypt input and/or encrypt output. However, at some point, all of the polymorphic primitives happen to read a valid input and write a valid output, as detected by the halting condition. If this process was entirely random, it would not occur in a practical timeframe, even for a tiny algorithm like this example. So the finite-state automata primitives 52 are used to address this. The finite-state primitives, through generation quasigroups, guide the co-incidence of valid inputs and outputs so that in amongst the vast random jumble of an executing metamorphic algorithm, some real work is actually being done.

Figure 14:
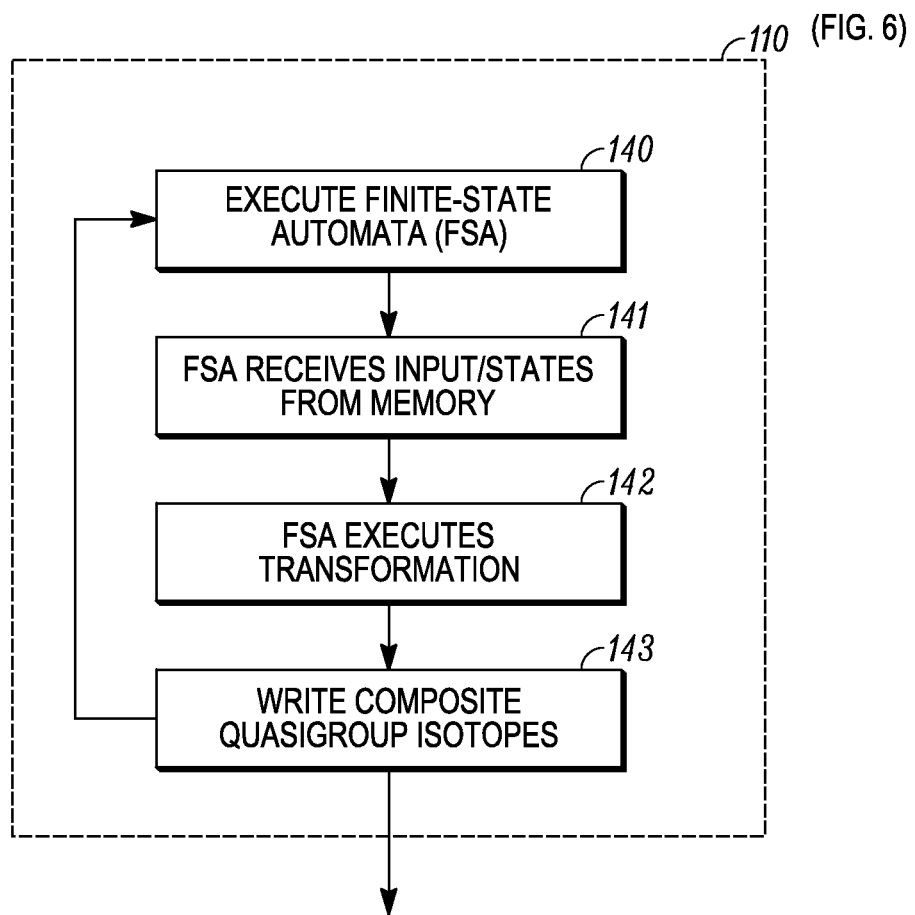
FIG. 14 is a flow diagram of creation of composite quasigroup isotopes using finite-state automata primitives.

The process will now be described in further detail with reference to FIG. 14, which shows step 110 of FIG. 6 in further detail. During execution, step 140, finite-state automata primitives 52 read state from the ostensibly random finite surface 57 and read a composite quasigroup isotope 46 from the static entropy container 49, step 141. It then performs a transformation based on an internally encoded function and internal state, step 142. It then writes one or more resultant composite quasigroup isotopes 46 to the dynamic entropy container 56 at locations also determined by internal states, step 143. The finite-state automata primitives 52 then navigate to a new input position on the finite surface 57 based on internally encoded logic and internal state, step 140 and the process starts again. The composite quasigroup isotopes 46 generated by the finite-state automata primitives 57 are used by the polymorphic primitives 43 (step 102 in FIG. 6) to decrypt input and encrypt output states such as function handles, parameters and return values (steps 103, 106 in FIG. 6.)

As previously mentioned, each isotope is assigned to a layer for use by one or more polymorphic primitives in that layer for encryption/decryption of outputs/inputs. Most of the time, the generated isotropes 46 assigned to a layer will not properly encrypt and decrypt. That is, a composite quasigroup isotope used in a layer by a first polymorphic primitive will result in encrypted output that cannot be decrypted by a second polymorphic primitive using another composite quasigroup isotope for that layer.

But, occasionally, randomly, a composite quasigroup isotope 46 used in a layer by a first polymorphic primitive for encrypting output will be a parastrophe (inverse) of a quasigroup isotope 46 used by a second polymorphic primitive to decrypt that output. Further, this process is guided, not random to coerce the process to a result. Even though the finite surface 57 appears uniformly random, it is encoded during the build process with small elements of local bias; in a manner similar to a watermark. The algorithms in the finite-state automata primitives 52 are selected and tuned by the compiler to cause some finite-state automata primitives to be attracted to specific input regions on the finite surface 57 more than others. The nature of the finite-state automata primitives 57 means that there will be co-incidences between the composite quasigroup isotopes 46 generated for a layer by the finite-state automata primitives 52. This leads to the generation of composite quasigroup isotopes used to encrypt a particular set of state elements and the generation of corresponding quasigroup parastrophes used to decrypt those elements.

When that happens, a polymorphic primitive can properly decrypt the encrypted output it receives from a parent polymorphic primitives. When it does not happen, any input a polymorphic primitive receives will not be correctly decrypted and any output state of the polymorphic primitives will be invalid. The co-incidences are designed to occur infrequently enough to ensure an adequate signal-to-noise ratio exists in the executing algorithm. Because correlation between a given quasigroup isotope and a corresponding parastrophe is computationally difficult, there is no practical way for an observer to identify when these co-incidences are occurring, therefore no concrete basis to understand which set of instructions is processing valid state and which are not.

In one variation, six finite-state automata primitives are generated (with many hundreds of polymorphic variations each). Each finite-state automata generates the layer based cryptographic state (composite quasigroup isotope) for a corresponding execution layer. This is used in conjunction with a secure handle (a compiler assigned 128 bit GUID) by polymorphic primitives in that layer to decrypt functions from the opaque function library 48, as well as encrypt and decrypt state stored in the dynamic entropy container.

An example of this execution for the XOR polymorphic primitive is set out below:

If this particular polymorphic variation of this primitive is executed, it may be executed before its inputs are in a valid state. One or more additional polymorphic variations of this primitive may be executed instead, step 100.

Reading and decrypting input from the dynamic entropy container (DEC) will most likely be carried out by other primitives (data abstraction primitives for reading and writing data, compact cipher primitives for decrypting, and call abstraction primitives and dynamic execution primitives for the "calls")

Low level primitives read and decrypt a series of memory addresses from the dynamic entropy container 56 based on the current cryptographic context and its own internal state. (The memory addresses can be considered as samples from the primitive's cryptographic context modulo the dynamic entropy container size and think of the internal state as a key.), steps 101, 103.

The primitive performs its transformation (XOR in this example) on the input values. It is likely that this transformation will be spurious because it will be operating on values that are either not at the correct memory locations in the DEC or in the desired cryptographic context. There is no way the primitive can tell if it is performing a "real" or a spurious transformation, step 104.

The polymorphic primitive 43 also transforms its internal state (using whatever transformations were compiled into the primitive). Usually for higher level primitives this involves setting the internal state based on a quasigroup transformation of the secure handle of a "called" polymorphic primitive and its own secure handle, such that some future transformation will (unwittingly) decrypt input state correctly and perform a valid transformation. In other words, a co-incidence between cryptographic state and internal state enables a primitive to processes a "return" value from a called primitive, step 105.

The polymorphic primitive 43 encrypts and writes the transformed input values to arbitrary addresses in memory (based on cryptographic context and internal state.) Again it is likely (for example, 99.9995% of the time) that these new values will be spurious and will be written into equally spurious locations in the dynamic entropy container 56. Also note that encrypting and writing values will most likely carried out by other polymorphic primitives in the same fashion as above. Step 106.

Most primitives will continue in a loop back to step 100. But, one or more top-level primitives (for example, the AES-CBC primitive 60) will have a known halting condition based on a comparison between internal state and an encoded constant, which if reached will result in output of data and termination of the process, steps 107, 108. The halting condition is a branching operation in a metamorphic algorithm; and it occurs in top-level primitives. For example the AES-CBC primitive 60 at the top of a deep tree of other primitives such as those illustrated in FIG. 9 would be the primitive in which the compiler inserts a halting condition.

When each polymorphic primitive has executed based on valid input, the process reaches a state where the output at that instance is the correct output (e.g. encrypted/decrypted information) of the underlying cipher algorithm (or part thereof, as in the XOR example above) itself. However, the polymorphic primitives (except for the top-level primitive checking for the halting condition) will not know that this state has been achieved. The top-level polymorphic primitive determines a halting condition, step 107, and when it has done so, the compiler then knows that the correct state/output has been achieved and the output should be read.

In overview, the halting condition works as follows. Every polymorphic primitive 43 has a secure handle, which is a 128 bit compiler generated globally unique identifier (GUID) that is randomly assigned to every primitive at compile time. During execution every primitive accepts a "second" input value (in addition to the input read from memory described above), which is one-way hashed with its GUID and passed as a "second" output along with its regular output. One or more top-level primitives compare these hash output values with a pre-defined value inserted by the compiler and emit their result only when the input hash value matches the value encoded in its local state—meaning the halting condition is met.

The compiler knows in advance what the valid sequence of primitive operations needed to produce the correct hash value outputs from our metamorphic algorithm 24. The halting condition allows these outputs to be achieved by a large number of polymorphic primitives 43 even if they are executing in parallel or out of sequence. A cryptographically secure one-way hash function is used to transform the hash value from a primitive's input parameters to the hash value it emits in its (secondary) output. This value is encoded in the top-level primitive as a halting condition. Only if the polymorphic primitives 43 have executed in a valid sequence (passing valid state between themselves) will the emitted hash value equal the halting condition. Only a small number of primitives have halting conditions; these are usually the top-level primitives that deal with external inputs and outputs.

Figure 12:
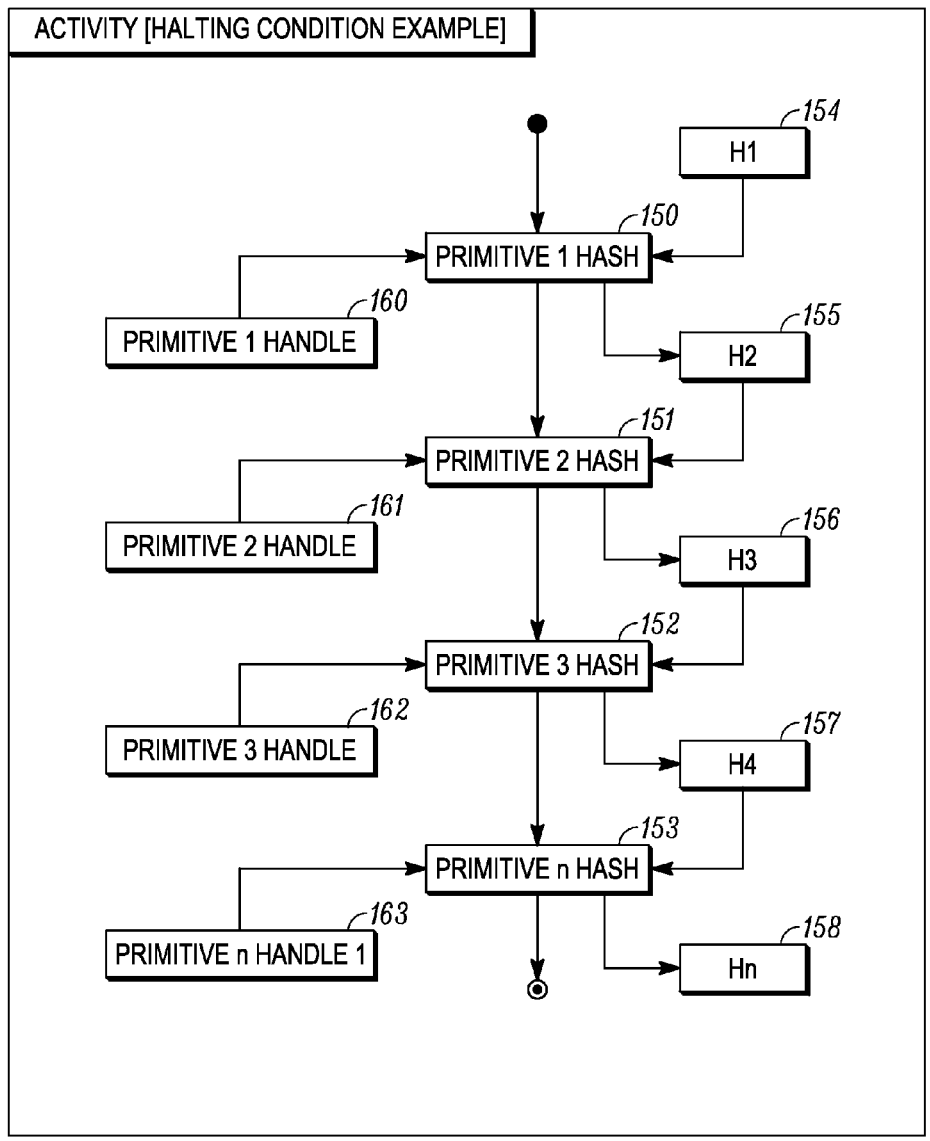
FIG. 12 is a flow diagram showing hash transformations made by polymorphic primitives.
Figure 13:
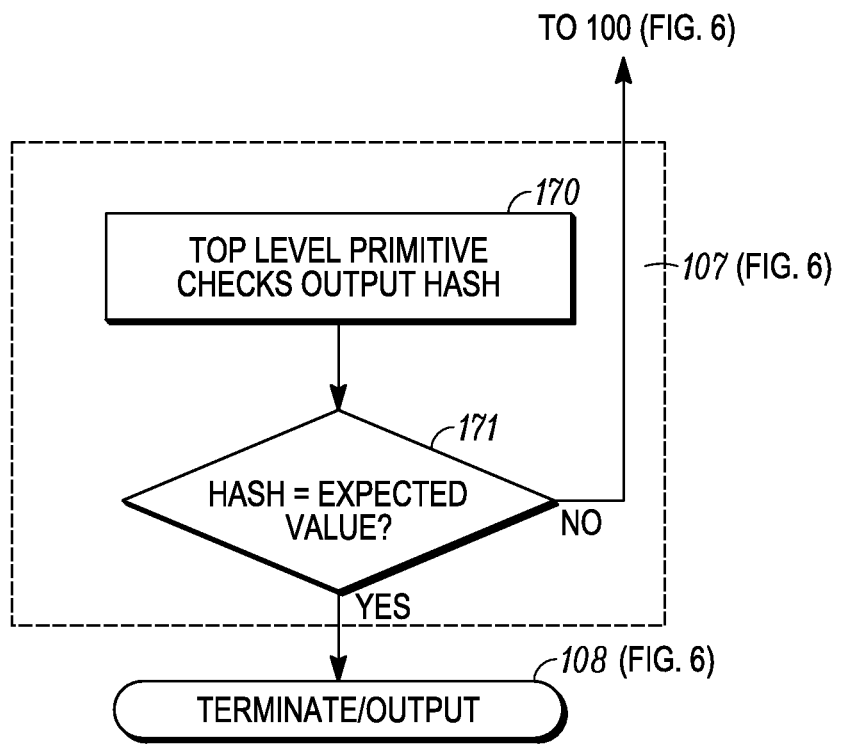
FIG. 13 is a flow diagram of the halting condition.

Referring to FIGS. 6, 12 and 13, the process will be explained in more detail. FIG. 13 shows the halting step 107 of FIG. 6 in more detail. Each polymorphic primitive (primitives 1-$n$) 150-153 has a GUID 160-163 and is configured to operate a one-way hash (in addition to their regular transformation). Upon execution, step 100, each polymorphic primitive 150-153 takes a hash value as a second input (H1-Hn) 154-158, step 101. Each polymorphic primitive hashes that input value in the one-way hash along with the primitive handle, step 105 and then writes a second output 155-158 to memory, step 106, being the one-way hash of the input hash value 154-158. It does this in tandem with its regular transformation described previously at step 106. The output hash value 155-158 of one polymorphic primitive 150-153 can become the input hash value 155-158 for another polymorphic primitive. The final hash value becomes the hash value of the top-level primitive which is used to determine if the halting condition is met, step 107.

If each polymorphic primitive 150-153 has executed in a valid sequence (that is, by passing valid states between themselves) the final hash output value 158 will be known, as it can be predicted based the interim inputs and subsequent output hash values 154-158 passed between each polymorphic primitive 154-158. If valid hash values (states) are not passed between one or more of the primitives, then the subsequent input and output hashes will not be as expected, resulting in the final hash value output not being the expected value. Hash value inputs are just another type of input and so invalid hash values will occur for the same reasons as invalid input as described earlier—namely if invalid hash values will occur if:

the hash value input to that polymorphic primitive is invalid, the polymorphic primitive is in the wrong cryptographic state, and/or the input comes from the output of a wrong polymorphic primitive.

Only if the polymorphic primitives have executed in a valid sequence (passing valid state between themselves) will the emitted hash value equal the expected value and the halting condition will be met. When that occurs, this indicates that a state is reached by the metamorphic algorithm resulting in valid output. The top-level primitive detects this halting condition, step 107, when it outputs the expected hash value as known by the compiler.

The halting condition determination is shown in more detail in FIG. 13. The top-level primitive checks its hash value output, step 170. If the hash value is an expected value, step 171, the halting condition is reached and then the process terminates, step 108. Otherwise the top-level primitive continues to execute (with all the other polymorphic primitives 43) step 100, and continues checking, step 170.

As the entire metamorphic algorithm is executed in this manner, a high level of security is provided due to:

the large numbers of polymorphic primitives in the opaque function library the very high signal to noise ratio of junk primitives to valuable ones the temporal decoupling (non-linearity) of executing primitives, and large combinatorial challenge (even given every decrypted primitive in the clear) of how these could be recombined into any given algorithm or correlated with any other primitive.

These layers add further security amplification by providing level of confusion and diffusion in both control and data pathways. That is, the computational tasks to be performed by any given algorithm are spread through many instructions and many states, in a similar way a cipher confuses the order or cleartext bits and further diffuses them into 50% of the bits of the resulting ciphertext.

Some or all of the operations set forth in FIGS. 1-15 may be contained as a utility, program, or subprogram, in any desired computer readable storage medium, which may be a non-transitory medium. In addition, the operations may be embodied by computer programs, which can exist in a variety of forms both active and inactive. For example, they may exist as software program(s) comprised of program instructions in source code, object code, executable code or other formats. Any of the above may be embodied on a computer readable storage medium, which include storage devices.

Exemplary computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

While the principles of the invention have been described above in connection with specific apparatus and method steps, it is to be clearly understood that this description is made only by way of example and not as a limitation on the scope of the invention.

What is claimed is:

1. A method of securing an executable program comprising a cipher with a plurality of functional components each of which can be implemented by one or more polymorphic code blocks, the method comprising the following in any order:

generating a composite quasigroup isotope for each layer in a plurality of layers, wherein each composite quasigroup isotope defines a cryptographic state for a polymorphic code block of the one or more polymorphic blocks in a respective layer, receiving input comprising information for encryption or decryption by the cipher, recursively executing the one or more polymorphic code blocks repeatedly in any sequence and/or in parallel, wherein on execution each polymorphic code block for a layer reads input from memory and generates and writes output to memory using a respective composite quasigroup isotope for the layer, wherein for any instance of execution the input and output might or might not be valid, and outputting resultant decryption or encryption of the information when the one or more polymorphic code blocks implementing the functional components of the cipher have all been executed to provide valid output, the resultant decryption or encryption of information being the output from one or more of the one or more polymorphic code blocks.

2. A method according to claim 1 wherein the read input comprises data that originates from a file, another polymorphic code block, network or other data source and upon execution the polymorphic code block executes at least a first transformation based on the data to generate the output.

3. A method according to claim 2 further comprising checking for a halting condition, wherein the read input further comprises an input hash value, the output further comprises an output hash value, and each polymorphic code block comprises an identifier, wherein upon execution each polymorphic code block executes a hash transformation based on the input hash value and identifier to generate the output hash value, and wherein checking for the halting condition in at least one polymorphic code block comprises:

comparing the output hash value of that polymorphic code block to an expected value, and determining occurrence of the halting condition when the output hash value of that polymorphic code block is the expected value.

4. A method according to claim 1 wherein invalid output from a polymorphic code block occurs when one or more of the following occur:

the polymorphic code block has the wrong cryptographic state, the polymorphic code block reads input originating from a wrong polymorphic code block or other data source, the read input is invalid.

5. A method according to claim 1 wherein a plurality of finite-state automata code blocks each generate the composite quasigroup isotope for each respective layer that defines the cryptographic state for the polymorphic code block in that layer.

6. A method according to claim 5 further comprising decrypting inputs read into and encrypting outputs written from the one or more polymorphic code blocks, wherein each such polymorphic code block is in a respective layer and decrypts and/or encrypts inputs and/or outputs using the composite quasigroup isotope for that respective layer.

7. A method according to claim 6 wherein a polymorphic code block in a respective layer correctly decrypts input when the composite quasigroup isotope for that layer is a parastrophe of the composite quasigroup isotope used to encrypt that input.

8. The method of claim 1 further comprising checking for a halting condition using at least one polymorphic code block, wherein outputting resultant decryption or encryption of the information occurs when the halting condition occurs, the halting condition occurring when the one or more polymorphic code blocks implementing the functional components of the cipher have all been executed to provide valid output, the resultant decryption or encryption of information being the output from one or more of the one or more polymorphic code blocks.

9. A method of creating a metamorphic algorithm to implement a cipher, comprising:

generating a composite quasigroup isotope for each layer in a plurality of layers, wherein each composite quasigroup isotope defines a cryptographic state for a polymorphic code block in a respective layer;

receiving a cipher, decomposing the cipher into polymorphic code blocks, where each polymorphic code block for a respective layer implements a functional component of the cipher using output from another polymorphic code block or other data source and a respective composite quasigroup isotope for the respective layer, and compiling a cipher kernel that upon execution recursively executes repeatedly polymorphic code blocks in a non-sequential and/or parallel manner to read input and write output that might or might not be valid.

10. An apparatus for securely implementing an executable program comprising a cipher with a plurality of functional components each of which can be implemented by one or more polymorphic code blocks, the apparatus comprising:

an input for receiving information for encryption or decryption by the cipher, an output for providing encrypted or decrypted information, and a processor configured to, in any order:

generate a composite quasigroup isotope for each layer in a plurality of layers, wherein each composite quasigroup isotope defines a cryptographic state for a polymorphic code block of the one or more polymorphic blocks in a respective layer, recursively execute the one or more polymorphic code blocks repeatedly in any sequence and/or in parallel, wherein on execution each polymorphic code block for a layer reads input from memory and generates and writes output to memory using a respective composite quasigroup isotope for the layer, wherein for any instance of execution the input and output might or might not be valid, and output resultant decryption or encryption of the information when the one or more polymorphic code blocks implementing the functional components of the cipher have all been executed to provide valid output, the resultant decryption or encryption of information being the output from one or more of the one or more polymorphic code blocks.

11. An apparatus according to claim 10 wherein the read input comprises data that originates from a file, another polymorphic code block, network or other data source and upon execution the polymorphic code block executes at least a first transformation based on the data to generate the output.

12. An apparatus according to claim 11 further comprising checking for a halting condition, wherein the read input further comprises an input hash value, the output further comprises an output hash value, and each polymorphic code block comprises an identifier, wherein upon execution each polymorphic code block executes a hash transformation based on the input hash value and identifier to generate the output hash value, and wherein checking for the halting condition in at least one polymorphic code block comprises:
comparing the output hash value of that polymorphic code block to an expected value, and
determining occurrence of the halting condition when the output hash value of that polymorphic code block is the expected value.

13. An apparatus according to claim 12 wherein a plurality of finite-state automata code blocks each generate the composite quasigroup isotope for each respective layer that defines the cryptographic state for the polymorphic code block in that layer.

14. An apparatus according to claim 13 wherein the one or more polymorphic code blocks decrypt inputs read and encrypt outputs written, wherein each such polymorphic code block is in a respective layer and decrypts and/or encrypts inputs and/or outputs using the composite quasigroup isotope for that respective layer.

15. An apparatus according to claim 14 wherein a polymorphic code block in a respective layer correctly decrypts input when the composite quasigroup isotope for that layer is a parastrophe of the composite quasigroup isotope used to encrypt that input.

16. An apparatus according to claim 10 wherein invalid output from a polymorphic code block occurs when one or more of the following occur:
the polymorphic code block has the wrong cryptographic state,
the polymorphic code block reads input originating from a wrong polymorphic code block or other data source,
the read input is invalid.

17. An apparatus for creating a metamorphic algorithm to implement a cipher, comprising:
an input for receiving a cryptographic algorithm,
a processor configured to:
generate a composite quasigroup isotope for each layer in a plurality of layers, wherein each composite quasigroup isotope defines a cryptographic state for a polymorphic code block in a respective layer,
receive a cipher,
decompose the cipher into polymorphic code blocks, where each polymorphic code block for a respective layer implements a functional component of the cipher using output from another polymorphic code block or other data source and a respective composite quasigroup isotope for the respective layer, and
compile a cipher kernel that upon execution recursively executes repeatedly polymorphic code blocks in a non-sequential and/or parallel manner to read input and write output that might or might not be valid.

18. A non-transitory computer readable medium containing instructions for a computer to perform a method of securing an executable program comprising a cipher with a plurality of functional components each of which can be implemented by one or more polymorphic code blocks, the method comprising the following in any order:
generating a composite quasigroup isotope for each layer in a plurality of layers, wherein each composite quasigroup isotope defines a cryptographic state for a polymorphic code block of the one or more polymorphic blocks in a respective layer;
receiving input comprising information for encryption or decryption by the cipher,
recursively executing the one or more polymorphic code blocks repeatedly in any sequence and/or in parallel, wherein on execution each polymorphic code block for a layer reads input from memory and generates and writes output to memory using a respective composite quasigroup isotope for the layer, wherein for any instance of execution the input and output might or might not be valid, and
outputting resultant decryption or encryption of the information when the one or more polymorphic code blocks implementing the functional components of the cipher have all been executed to provide valid output, the resultant decryption or encryption of information being the output from one or more of the one or more polymorphic code blocks.

19. A non-transitory computer readable medium according to claim 18 wherein the read input comprises data that originates from a file, another polymorphic code block, network or other data source and upon execution the polymorphic code block executes at least a first transformation based on the data to generate the output.

20. A non-transitory computer readable medium according to claim 19 further comprising checking for a halting condition,
wherein the read input further comprises an input hash value, the output further comprises an output hash value, and each polymorphic code block comprises an identifier,
wherein upon execution each polymorphic code block executes a hash transformation based on the input hash value and identifier to generate the output hash value, and
wherein checking for the halting condition in at least one polymorphic code block comprises:
comparing the output hash value of that polymorphic code block to an expected value, and
determining occurrence of the halting condition when the output hash value of that polymorphic code block is the expected value.

21. A non-transitory computer readable medium according to claim 20 wherein a plurality of finite-state automata code blocks each generate the composite quasigroup isotope for each respective layer that defines the cryptographic state for the polymorphic code block in that layer.

22. A non-transitory computer readable medium according to claim 21 further comprising decrypting inputs read into and encrypting outputs written from the one or more polymorphic code blocks, wherein each such polymorphic code block is in a respective layer and decrypts and/or encrypts inputs and/or outputs using the composite quasigroup isotope for that respective layer.

23. A non-transitory computer readable medium according to claim 22 wherein a polymorphic code block in a respective layer correctly decrypts input when the composite quasigroup isotope for that layer is a parastrophe of the composite quasigroup isotope used to encrypt that input.

24. A non-transitory computer readable medium according to claim 18 wherein invalid output from a polymorphic code block occurs when one or more of the following occur:
the polymorphic code block has the wrong cryptographic state,
the polymorphic code block reads input originating from a wrong polymorphic code block or other data source,
the read input is invalid.

25. A non-transitory computer readable medium carrying instruction for a computer to perform a method of creating a metamorphic algorithm to implement a cipher, comprising:
generating a composite quasigroup isotope for each layer in a plurality of layers, wherein each composite quasigroup isotope defines a cryptographic state for a polymorphic code block in a respective layer, receiving a cipher,
decomposing the cipher into polymorphic code blocks, where each polymorphic code block for a respective layer implements a functional component of the cipher using output from another polymorphic code block or other data source and a respective composite quasigroup isotope for the respective layer, and
compiling a cipher kernel that upon execution recursively executes repeatedly polymorphic code blocks in a non-sequential and/or parallel manner to read input and write output that might or might not be valid.

* * * * *